(12) United States Patent
Winkler et al.

(10) Patent No.: US 12,421,046 B2
(45) Date of Patent: Sep. 23, 2025

(54) TRANSPORT AND MANIPULATION SYSTEM AND METHOD FOR TRANSPORTING LOAD CARRIERS

(71) Applicant: TGW Logistics GmbH, Marchtrenk (AT)

(72) Inventors: Markus Winkler, Altmuenster (AT); Maximilian Beinhofer, Thalheim bei Wels (AT)

(73) Assignee: TGW Logistics GmbH, Marchtrenk (AT)

( * ) Notice: Subject to any disclaimer, the term of this patent is extended or adjusted under 35 U.S.C. 154(b) by 739 days.

(21) Appl. No.: 17/636,163

(22) PCT Filed: Aug. 21, 2020

(86) PCT No.: PCT/AT2020/060315
§ 371 (c)(1),
(2) Date: Feb. 17, 2022

(87) PCT Pub. No.: WO2021/030852
PCT Pub. Date: Feb. 25, 2021

(65) Prior Publication Data
US 2022/0332508 A1 Oct. 20, 2022

(30) Foreign Application Priority Data

Aug. 22, 2019 (AT) .................. A 50731/2019

(51) Int. Cl.
*B65G 1/06* (2006.01)
*B65G 1/04* (2006.01)
(Continued)

(52) U.S. Cl.
CPC ......... *B65G 1/1378* (2013.01); *B65G 1/0492* (2013.01); *B65G 1/065* (2013.01);
(Continued)

(58) Field of Classification Search
CPC .. B65G 1/1378; B65G 1/0492; B65G 1/1373; B65G 2203/0291; B65G 2207/40;
(Continued)

(56) References Cited

U.S. PATENT DOCUMENTS 9,760,086 B2 9/2017 Woodtli et al.
9,821,960 B2 11/2017 Issing
(Continued)

FOREIGN PATENT DOCUMENTS

CA 3161682 A1 7/2016
CN 103764523 A 4/2014
(Continued)

OTHER PUBLICATIONS

L1: Ullrich, Günter, "Driverless transport systems. A primer—with practical applications—to technology—for the planning". Springer Vieweg Fachmedien Verlag, Wiesbaden/Germany. 2nd Edition 2014. Chapter 3.1, pp. 106-121, Chapter 3.4.4, pp. 171-173.
(Continued)

*Primary Examiner* — Thomas Randazzo
(74) *Attorney, Agent, or Firm* — Collard & Roe, P.C.

(57) ABSTRACT

A transport and manipulation system has an activity area in which a provisioning device is arranged which includes takeover and handover stations. The activity area includes a working area in which static workstations for manually executing processing orders are arranged, and a travel area, in which autonomous transport vehicles can move. Each transport vehicle is configured for automatically picking up a load carrier at the takeover station according to a transport order, transporting the load carrier to a workstation and depositing the load carrier at the workstation, or picking up the load carrier at the workstation, transporting the load carrier to the handover station and depositing the load carrier at the handover station. The travel area includes first and (Continued)

second travel sections defining therein first and second travel speeds, respectively. The second travel speed is higher than the first travel speed. The second travel section is bounded against the first travel section, wherein transport vehicles can pass the boundary at a passing zone.

35 Claims, 5 Drawing Sheets

(51) Int. Cl.
- *B65G 1/137* (2006.01)
- *B66F 9/06* (2006.01)
- *G05B 19/418* (2006.01)
- *G06Q 10/087* (2023.01)

(52) U.S. Cl.
CPC ............ *B65G 1/1373* (2013.01); *B66F 9/063* (2013.01); *G05B 19/41895* (2013.01); *G06Q 10/087* (2013.01); *B65G 2203/0291* (2013.01); *B65G 2207/40* (2013.01)

(58) Field of Classification Search
CPC ... B65G 1/065; B66F 9/063; G05B 19/41895; G06Q 10/087
See application file for complete search history.

(56) References Cited

U.S. PATENT DOCUMENTS

| | | | |
|---|---|---|---|
| 10,207,871 | B2 | 2/2019 | Issing |
| 10,803,420 | B2 | 10/2020 | Jarvis et al. |
| 2013/0275045 | A1 | 10/2013 | Tsujimoto et al. |
| 2014/0100998 | A1 | 4/2014 | Mountz et al. |
| 2014/0365258 | A1* | 12/2014 | Vestal ............ G06Q 10/063114 901/1 |
| 2016/0229631 | A1 | 8/2016 | Kimura et al. |
| 2017/0144307 | A1 | 5/2017 | Rublee et al. |
| 2017/0166400 | A1 | 6/2017 | Hofmann |
| 2018/0053141 | A1* | 2/2018 | Shydo, Jr. .............. G05D 1/104 |
| 2018/0211347 | A1 | 7/2018 | Chen et al. |
| 2018/0275664 | A1 | 9/2018 | Fujii et al. |
| 2020/0302391 | A1* | 9/2020 | Li ...................... G06Q 10/0875 |
| 2020/0307924 | A1 | 10/2020 | Wieschemann et al. |
| 2020/0387154 | A1* | 12/2020 | Sellner ................. G05D 1/0027 |
| 2021/0024298 | A1 | 1/2021 | Doppler et al. |
| 2021/0221615 | A1 | 7/2021 | Buchmann |

FOREIGN PATENT DOCUMENTS

| | | | | |
|---|---|---|---|---|
| CN | 105858045 | A | | 8/2016 |
| CN | 107428465 | A | | 12/2017 |
| CN | 108027617 | A | | 5/2018 |
| CN | 109641707 | A | | 4/2019 |
| DE | 10 2015 114 393 | A1 | | 3/2017 |
| DE | 3180274 | A1 | * 6/2017 | ........... B65G 1/0407 |
| DE | 3180275 | A2 | * 6/2017 | ............... B65G 1/06 |
| DE | 102016110820 | A1 | * 12/2017 | ........... B65G 1/1375 |
| EP | 3 180 274 | B1 | | 12/2017 |
| EP | 3 180 275 | B1 | | 12/2017 |
| JP | 2018-163415 | A | | 10/2018 |
| WO | 2018/006112 | A1 | | 1/2018 |
| WO | 2018/064639 | A1 | | 4/2018 |
| WO | 2018/168060 | A1 | | 9/2018 |
| WO | 2019/169419 | A1 | | 9/2019 |

OTHER PUBLICATIONS

L2: Cetin, Deniz "The modern conveyer and picking systems Pick-to-Light, Pick-by-Voice and driverless transport systems". Bachelor + Master Publishing, Imprint der Diplomica Verlag GmbH, Hamburg/Germany, 2014. Chapter 6, pp. 22-30.

L3: Rohrhofer, Christian and Graf, Hans-Christian "Intralogistics and logistics technology. White paper on the use of technology in logistics". Shaker Verlag, Aachen/Germany. 2nd revised Edition, 2018. Chapter 3.2.5, pp. 90-99.

AJ Dellinger, "Amazon made a vest to keep robots from pummeling humans", Jan. 18, 2019, total of 2 pages.

International Search Report in PCT/AT2020/060315, mailed Jan. 13, 2021.

* cited by examiner

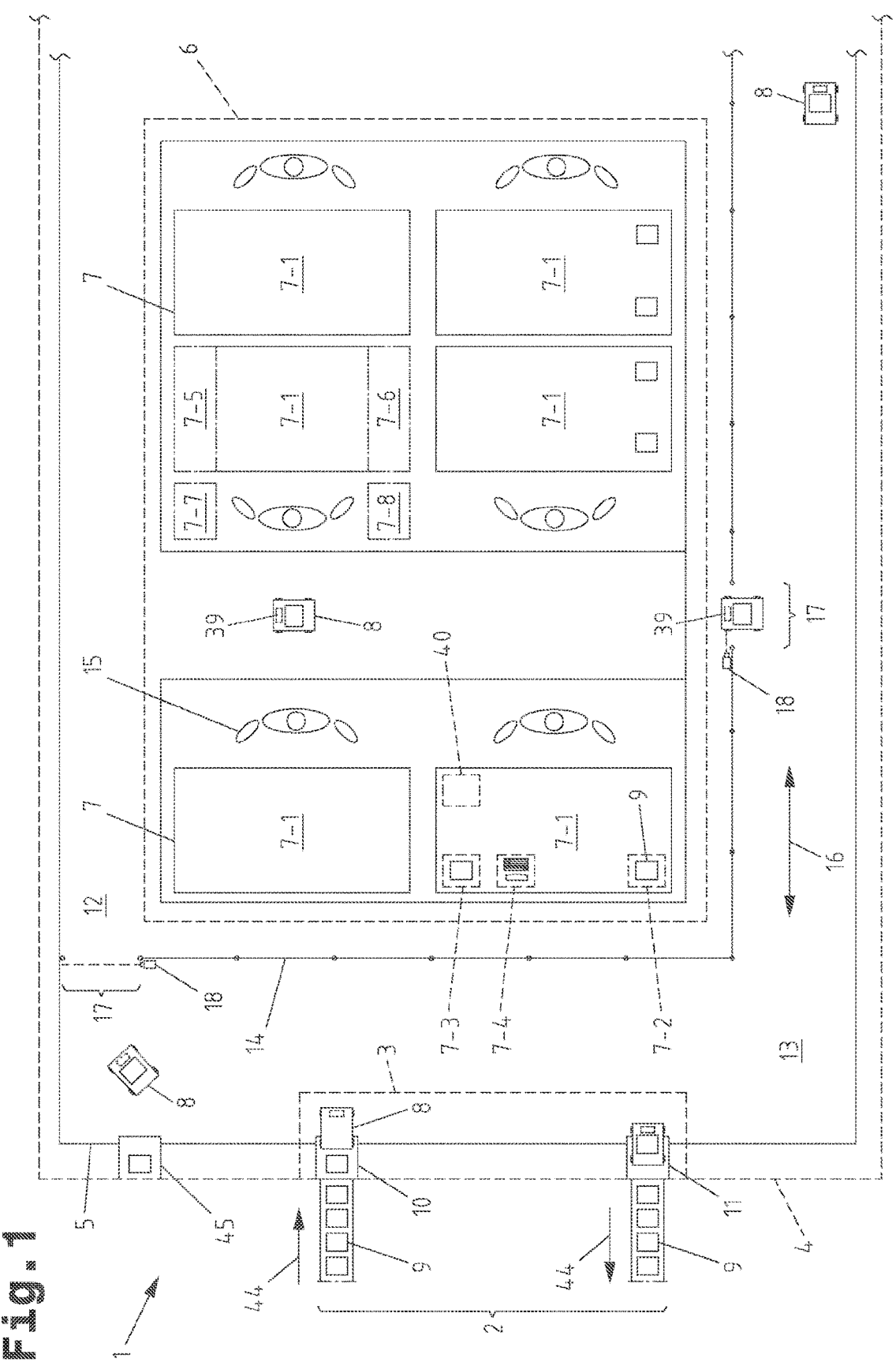

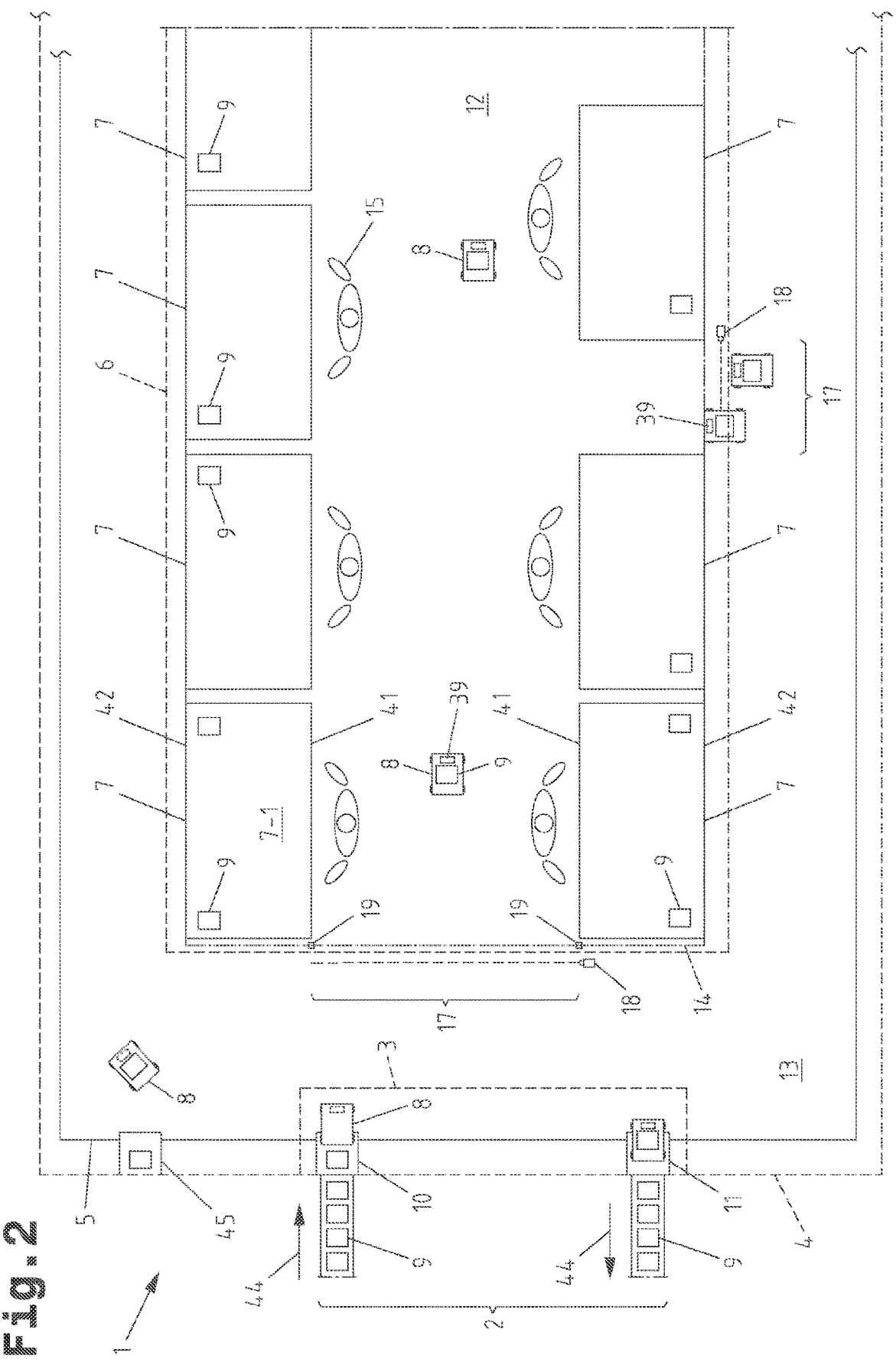

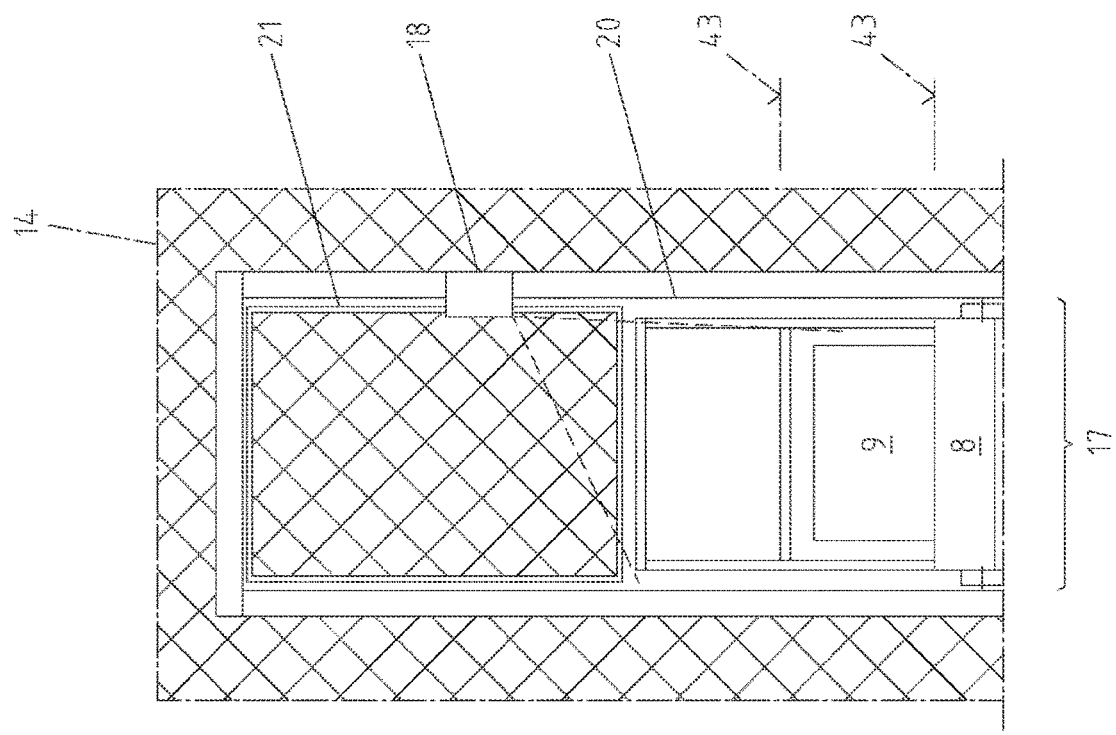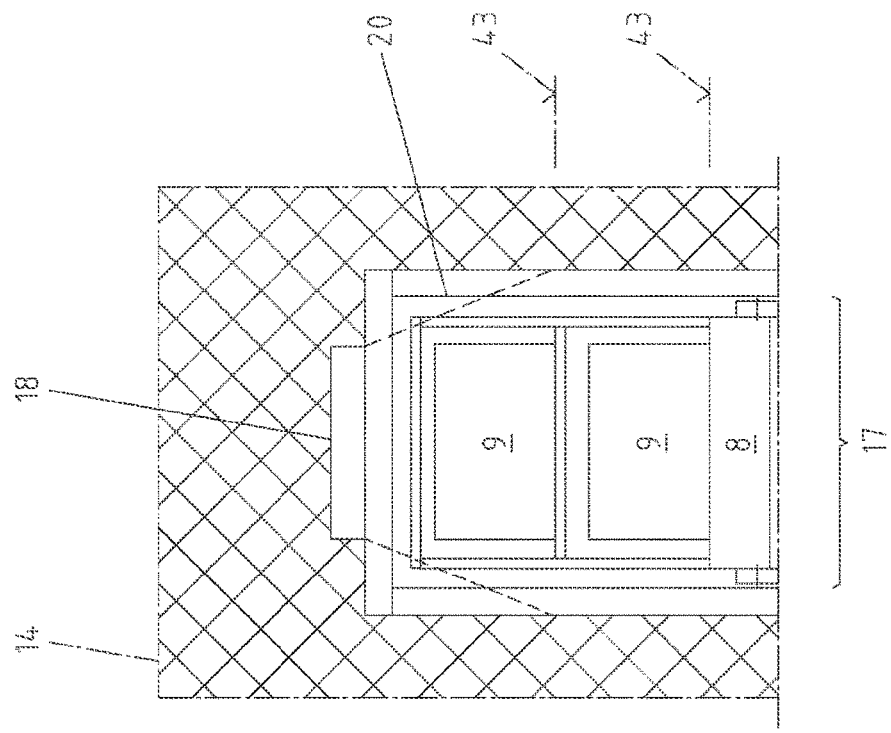

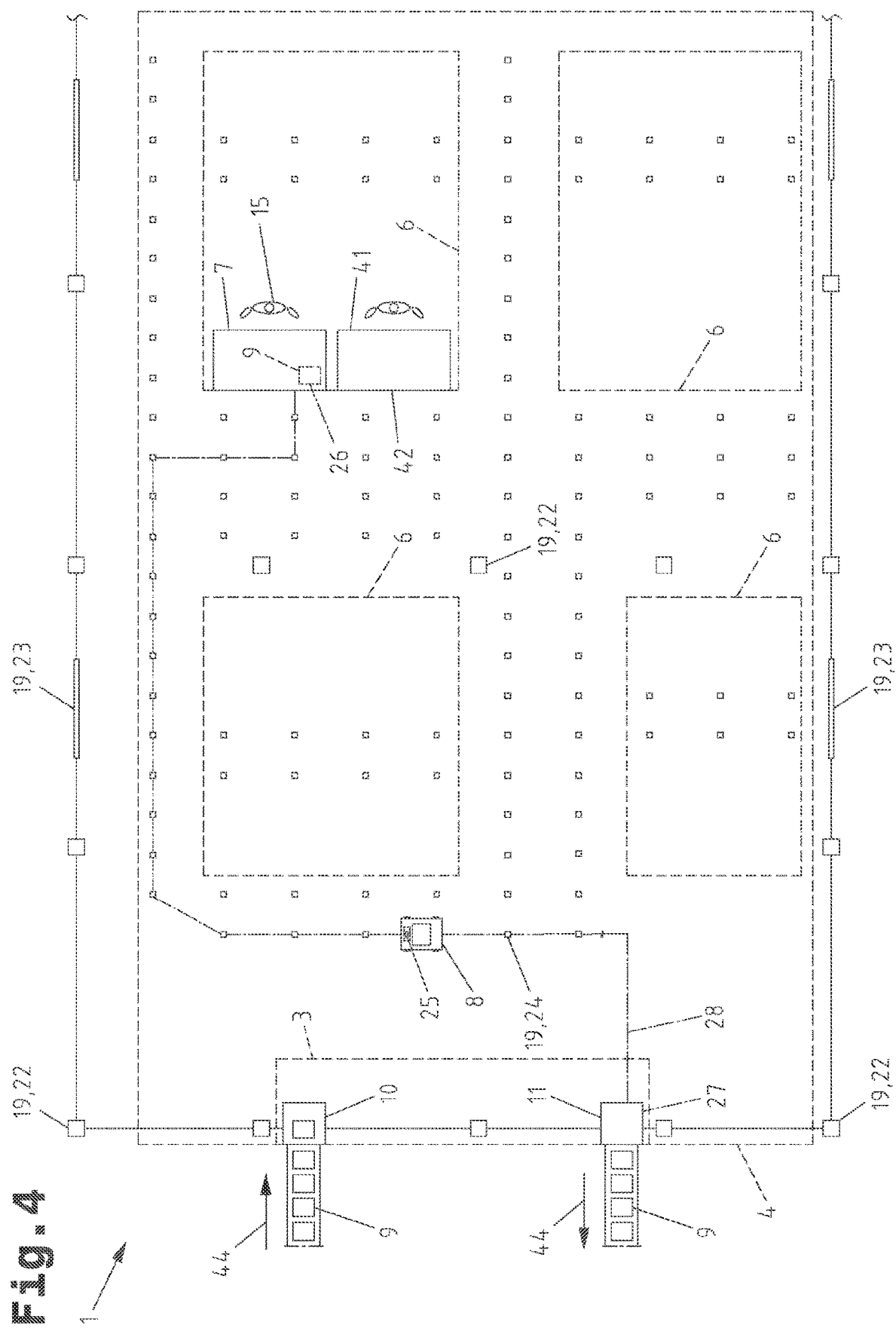

TRANSPORT AND MANIPULATION SYSTEM AND METHOD FOR TRANSPORTING LOAD CARRIERS

CROSS REFERENCE TO RELATED APPLICATIONS

This application is the National Stage of PCT/AT2020/060315 filed on Aug. 21, 2020, which claims priority under 35 U.S.C. § 119 of Austrian Application No. A 50731/2019 filed on Aug. 22, 2019, the disclosure of which is incorporated by reference. The international application under PCT article 21(2) was not published in English.

BACKGROUND OF THE INVENTION

1. Field of the Invention

The invention relates to a transport and manipulation system and a method for transporting load carriers and for executing manual processing orders in such a transport and manipulation system. In accordance with the invention, such processing orders do not comprise picking orders. The processing orders are different from picking orders. For instance, a processing order may follow a picking order as soon as one or multiple order lines have been picked for this picking order.

2. Description of the Related Art

Even in highly automated intralogistics systems, there will be working areas where orders are manually processed by an operator. The manual processing of an order is done at a workstation, at which the article(s) to be manipulated, and required working means, are available to the operator. The processing orders comprise value added services, for example, and are carried out after the processing of a picking order. The processing orders are therefore different from the picking orders and do not consist in compiling articles to form customer orders. For example, a processing order comprises the application of a gift wrapping. In such an application, the order articles (articles which have been compiled to form a picking order) and the packaging material (working means) are to be provisioned at a workstation. The processing order is usually very labor-intensive, and the processing is therefore time-consuming. In contrast to this, the articles can usually be provisioned at the workstation very swiftly. The particular challenge lies in adapting the high throughput of a highly automated intralogistics system to the considerably lower performance requirement at a (manual) workstation.

Different transport systems are known which connect the workstations where processing orders are carried out manually with a fully automated article storage, for example a shuttle storage.

According to a first embodiment, the transport system may comprise a stationary conveying system. While being very efficient, such stationary conveying systems are also very inflexible. A re-configuration of the stationary conveying system is enormously labor-intensive. In addition, the stationary conveying systems are "oversized" in comparison to the processing capacity. The operator is not able to complete the processing orders in a manner commensurate to the transport throughput of the stationary conveying system.

According to a second embodiment, the transport system may comprise a mobile conveying system having autonomous transport vehicles.

The autonomous transport vehicles distribute the high throughput of the fully automatic article store over the area of an activity area in which static workstations for manually executing processing orders are arranged and in which the autonomous transport vehicles are moved. The considerably lower transport throughput of a single autonomous transport vehicle can be compensated for by a corresponding number of simultaneously operating transport vehicles. In particular, the transport throughput of each single transport vehicle is sufficient for operating a workstation.

For example, DE 10 2015 114 393 A1 shows a picking system having manipulators and autonomously displaceable transport vehicles. The picking system generally works according to the person to goods principle. The transport orders for the transport vehicles are generated such that, while executing its activity order, each of the manipulators can execute its transfer activities without interruption.

Similar picking systems are also known from EP 3 180 274 B1 and EP 3 180 275 B1.

A rendezvous-picking using autonomous transport vehicles is known from DE 10 2016 110 820 A1, wherein a control device coordinates, at a variable picking station, the meeting (=rendezvous), synchronized as to time and location, of an order picker, a number of source load carriers (source containers) specific to the customer order and a number of target load carriers (target containers) specific to the customer order.

A picking system is known from WO 2018/064639 A1 in which autonomous transport vehicles move articles between a first storage area, second storage area and picking workstations.

A picking system is known from US 2014/100998 A1 in which autonomous transport vehicles transport load carriers from a storage area to picking workstations and shipping containers from the picking workstations to a shipping station.

WO 2018/168060 A1, US 2018/211347 A1 and US 2016/229631 A1 disclose picking systems in which load carriers are transported to picking workstations and/or away from picking workstations by autonomous transport vehicles.

Transport systems in which load carriers are taken to workstations by transport vehicles can equally be gleaned from US 2013/275045 A1 and JP 2018/163415 A.

Transport systems in which autonomous transport vehicles and persons operate essentially side by side can be gleaned from US 2018/053141 A1 and US 2017/144307 A1. In this case, the transport vehicles reduce their travel speed in sections if persons enter the respective area. The respective areas are assigned, in particular dynamically, for this purpose.

SUMMARY OF THE INVENTION

It is therefore the object of the invention to create a transport and manipulation system and a method for transporting load carriers and for executing manual processing orders at workstations which enables an optimized transport of load carriers to/from the workstations and provides a safe work environment for the persons, even if the load carriers are transported automatically by autonomous transport vehicles.

The object of the invention is achieved by a transport and manipulation system comprising at least one activity area, the at least one activity area having a provisioning device with a takeover station and a handover station, at least one working area, in which a plurality of static workstations for manually executing processing orders by persons are arranged, and at least one travel area, in which a plurality of autonomous transport vehicles (autonomous mobile robots—AMRs) can move and which connect the provisioning device with the workstations, wherein at the takeover station, a source load carrier is picked up from an autonomous transport vehicle, wherein at the handover station, a target load carrier is deposited from an autonomous transport vehicle, wherein the transport vehicles each comprise a control unit configured for receiving and evaluating transport orders from a warehouse management system (WMS), wherein the transport vehicles are automatically and autonomously controlled in accordance with the transport orders and in such a manner that a source load carrier is picked up at the takeover station, transported to one of the workstations and provisioned at the one workstation, at least for a first transport order of the transport orders, in order to subsequently execute a processing order at this workstation, and a target load carrier is picked up at one of the workstations, transported to the handover station and deposit at the handover station, at least for a second transport order of the transport orders, after a processing order has been completed at this workstation, and wherein each transport vehicle is further configured for receiving a travel path specification at the control unit and independently following the travel path specification by capturing and evaluating navigation markers.

The travel area has a first travel section and a second travel section, wherein the first travel section protrudes into the at least one working area. In the first travel section, a first maximum travel speed is defined for the transport vehicles, in particular a maximum first travel speed which is safe for persons, and in the second travel section, a second maximum travel speed is defined for the transport vehicles, wherein the second maximum travel speed is higher than the first maximum travel speed. Optionally, the second maximum travel speed may be higher than a maximum design speed of the transport vehicles or of at least one transport vehicle of the transport vehicles. In this way, a transport throughput of the transport vehicles can be utilized efficiently and/or the transport and manipulation system can optionally be equipped with faster transport vehicles or retrofitted with such faster transport vehicles. The second travel section is bounded against the first travel section by a boundary which can be passed by the transport vehicles at at least one predetermined passing zone (only).

Preferably, the first maximum travel speed and/or the second maximum travel speed is defined by a superordinate control system, in particular a warehouse management system or a fleet management system. Furthermore, it is advantageous if the control unit of the respective transport vehicle controls/regulates the travel speed, so that the specified maximum travel speeds can be observed. To this end, the first maximum travel speed and/or the second maximum travel speed can be transmitted, by the control system, to the control unit of the transport vehicles. The first maximum travel speed and/or the second maximum travel speed can be stored, in particular as a parameter, in the travel path specification. The parameter can in particular be defined as a variable.

The takeover station and the handover station of the provisioning device of the transport and manipulation system adjoin to a load carrier conveying system operated in an automated manner. The load carrier conveying system is a stationary load carrier conveying system. Usually, also an article receiving area, article issue area and picking system having one or multiple picking workstations for automatically/manually executing picking orders are adjoined to the load carrier conveying system, wherein picking orders (but not processing orders) are processed at the picking workstations.

The high transport throughput of the load carrier conveying system (high-performance conveying system) is divided between a plurality of autonomous transport vehicles, which, in turn, distribute load carriers over a plurality of workstations for executing manual processing orders (but not picking orders).

The load carrier conveying system operated in an automated manner connects an article storage operated in an automated manner and the provisioning device in order to transport at least some of the load carriers between the article storage and the provisioning device. The provisioning device forms the handover and takeover interface with the load carrier conveying system operated in an automated manner. The load carrier conveying system and/or the (fully automatic) article storage operated in an automated manner can optionally also be operated below the maximum (transport) throughput, as the performance requirement at the workstations for executing manual processing orders is lower.

The takeover station and handover station may be provided separately. On the other hand, the takeover station and handover station may also be combined and be formed by a single takeover and handover station.

It is provided in accordance with the invention that the transport vehicles can switch between the first travel section and second travel section at at least one predetermined passing zone. The passing zone is defined during the planning and installation of the activity area and is therefore essentially fixed in place. In an advantageous manner, the passing zone is arranged such that the transport vehicles can be moved at the second maximum travel speed for as long as possible, so that the start and/or target position of the respective transport order can be reached as quickly as possible.

According to the preferred embodiment, it is provided that the workstations are arranged in a static configuration in order to fulfill, in the best possible manner, the processing orders to be carried out. In this context, "static" means that, during operation of the transport and manipulation system, the position of the workstations does not change. However, this does not exclude the possibility of workstations to be retrospectively positioned in a different configuration. Yet the positions of the workstations in the working area are generally defined during the planning and installation of the activity area. The changing of the positions of the workstations (workstation layout) requires a re-configuration, at any rate. For example, it may be of advantage if specific workstations are installed adjacent to one another if the type of the processing orders at the workstations changes.

It should also be noted that the use of a workstation is not limited to a single processing step, but different processing orders can be executed at it. This is the case primarily because the autonomous transport vehicles are usually not limited to transporting a single type of article or working means.

The transport vehicle preferably receives the travel path specification wirelessly from the warehouse management system (WMS) or from a fleet management system (FMS). In accordance with the preferred embodiment, it is not provided that the transport vehicle detects the travel path specification independently, for example via its own control unit.

In the transport and manipulation system in accordance with the invention, automatic transport vehicles and persons operate in the activity area, in particular when the transport vehicles approach the workstations. At any rate, it must be ensured that no danger to persons is posed by the transport vehicles. Safety guidelines define a maximum travel speed at which the transport vehicles can be moved if persons are located in the activity area. The travel speed is defined such that a transport vehicle can stop in front of a person (or generally an obstacle) suddenly appearing in the travel path. This "safety speed" is often lower than the maximum speed at which the transport vehicle could travel-whereby transport capacity is "wasted."

In order to reach a high transport throughput nevertheless, it is provided to divide the travel area into a first travel section and a second travel section by a boundary. In the first travel section, the transport vehicles are moved at "reduced" travel speed, as persons move or are located in the close range of the first travel section or in the first travel section on a regular basis. In the second travel section, in contrast, the transport vehicles can be moved at "higher" travel speed, as persons move or are located in the second travel section only occasionally. In the second travel section, depending on traffic, the transport vehicles can be moved even at maximum travel speed. During normal operation, the persons can also not readily leave the first travel section and move into the second travel section. Safety-technology precautions have been taken to prevent this. In particular, there is a boundary between the first travel section and second travel section, for example a physical barrier, such as a safety fence.

The transport and manipulation system in accordance with the invention fulfills not only the safety-technology provisions but is able to respond in a particularly flexible manner to changing requirements. If the type of a processing order changes at a workstation (for example, instead of packaging the shipments of articles, package inserts are to be enclosed with the shipments of articles), the working means can be provisioned by the transport vehicles without any great effort. A change of the workstation layout is not required to this end. The transport vehicles optionally also enable a performance adapted transport of articles/load carriers depending on the processing orders to be executed. In this case, also the stationary load carrier conveying system and article storage located upstream of the transport and manipulation system can be operated in a performance adapted manner.

According to one advancement, it is provided that the takeover station and/or the handover station of the provisioning device is connected (in terms of conveyance), via a load carrier conveying system, with at least one from the group of article storage for storing articles in the load carriers, picking system having one or multiple picking workstations, article receiving area or article issue area.

The autonomous transport vehicles connect the load carrier conveying system and the workstations for manually executing processing orders (but not picking orders). The high transport throughput of the load carrier conveying system (high-performance conveying system) is divided between a plurality of autonomous transport vehicles, which, in turn, distribute load carriers over a plurality of workstations for executing manual processing orders (but not picking orders). As described above, the transport vehicles also enable a performance adapted transport of articles/load carriers depending on the processing orders to be executed.

Yet the autonomous transport vehicles can also connect the workstations for manually executing processing orders (but not picking orders) and the article receiving area/article issue area.

Yet, generally, the autonomous transport vehicles can also connect the workstations for manually executing processing orders (but not picking orders) and the picking workstations for automatically/manually executing picking orders (but not processing orders) if these are not adjoined to the load carrier conveying system by stationary conveying devices.

The load carrier conveying system comprises conveying devices for transporting unit loads, such as roller conveyors, belt conveyors, belt offsets and suchlike, and/or lifting devices for transporting unit loads, such as vertical lifts, paternosters and suchlike. Yet the load carrier conveying system may also comprise an overhead conveying device. Also a combination of conveying device, lifting device and/or overhead conveying device is possible.

The load carrier is a container, cardboard box, tray or hanging bag, for example. Also a combination of container, cardboard box, tray or hanging bag is possible.

One advancement further consists in that the travel area and the working area partially overlap. In the activity area near the workstations, the travel area can serve, in sections, also as a working area. Persons and transport vehicles can be located there at the same time. Yet, for the detection of the travel path specifications, it is of advantage, in principle, if the possible movement range for the transport vehicles is limited as little as possible, as this enables route-optimized travel path specifications to be detected.

One advancement consists in that the travel area is defined by a barrier or by the presence of navigation markers. For intrinsic and extrinsic safety, transport vehicles have means to identify a contact with an object and/or an approach toward an object in the travel path and then bypass the object or stop in front of it. According to this advancement, the travel area admissible for a transport vehicle could therefore be defined in a very simple manner by structural means. Yet it is also possible for the travel area to be determined by navigation markers. For example, the transport vehicle can detect, on the basis of the presence and/or non-presence of such markers, the area in which it is allowed to move. This embodiment has in particular the advantage that multiple restricted travel areas next to one another can be realized, wherein it is ensured that the transport vehicles remain in their own travel areas at all times.

An advantageous advancement also consists in that a plurality of navigation markers is arranged in the travel area, in particular on the floor of the travel area. This advancement ensures that a transport vehicle has a navigation marker at its disposal most of the time, in particular independent of the occupation of the travel area by other transport vehicles and persons. Preferably, the navigation markers are arranged on the floor in a regular grid, wherein the grid spacing is larger than/equal to the longest external dimension of the transport vehicle. The longest external dimension parallel to the floor, plus a safety clearance, corresponds to the minimum width of a travel aisle. Preferably, the navigation markers are readable in a contactless manner, in particular optically, and may be formed, in accordance with possible embodiments, by 1D and/or 2D codes (barcode, QR code, data matrix code, etc.). It is also of advantage that a transport vehicle in motion can repeatedly capture a navigation marker, and therefore a precise navigation inside the travel area, and primarily a precise adherence to the travel path, is possible.

According to one advancement, it is provided that the navigation markers are formed by structural features inside a space surrounding the transport and manipulation system. This advancement has the advantage that no additional markers need be applied and existing features of the space can be used for navigation. For example, constructive elements of the space (pillars, doors, gates, windows, etc.), but also the workstations, may serve as navigation markers. It should be noted that constructive elements of the space may also be located inside an external border. For example, a larger hall, for static reasons, will have pillars also on the interior, which also fall under this advancement. It is further advantageous if navigation markers are formed, for example, by elements of the roof structure, for example girders or elements arranged on the roof structure, such as lighting means, dome lights, etc. As each transport vehicle has an excellent view upward most of the time, elements in the ceiling area can easily be captured and therefore used as waypoints. According to the advancement at issue, elements are preferably selected such that they are captured on a regular basis during an operation in accordance with the intended purpose of the transport vehicles, so that the transport vehicles can accomplish the autonomous navigation.

One advancement consists in that the transport vehicle comprises a control unit having a memory means configured for storing a map of the navigation markers. During the autonomous traveling operation, it may occur that the next navigation marker to be followed cannot be captured, for example because it is dirty, damaged or temporarily blocked by an obstacle (a person or another transport vehicle), or the lighting conditions in place do not allow a capturing.

Hence, this advancement has the advantage that the transport vehicle can then instantly try to capture alternative navigation markers. For example, the transport vehicle could maintain the current direction of travel until a navigation marker can be captured again. Knowing all navigation markers then enables the transport vehicle to determine a correction path for the travel path specification and autonomously follow it. It should be noted that each navigation marker as such clearly identifies only one position, in particular merely its own position. Where in the working area this position is located and which other navigation marker is located where in the immediate vicinity is defined by the map at issue. In a comparison with chess, the navigation marker corresponds to a specification of a square, for example H7, and the chessboard corresponds to the map. According to another possible embodiment, it would also be possible that the transport vehicle then reports its current position back to the superordinate fleet management system (FMS) and requests and/or receives a new travel path specification.

Possible embodiments for creating a map are described below. According to a first embodiment, the map can be created in advance, during the planning of the activity area, at the CAD (computer aided design) and be transmitted to the respective control unit of each transport vehicle. The advantage of this variant consist in that each transport vehicle has a complete map of the entire activity area at its disposal instantly upon start-up. According to a second embodiment, the transport vehicles are dispatched in order to capture their surroundings automatically and create the map in the process. The advantage of this variant consists in that no configuration work whatsoever is required beforehand and each transport vehicle always has an up-to-date map at its disposal. If deviations in the configuration of the working area occur during operation of the transport and manipulation system, for example because an additional working area has been installed, the moving transport vehicles can capture this change and update the stored map. Further, it may be provided according to one advancement that not each transport vehicle need travel the entire activity area, but that the transport vehicles communicate with one another and swap map data by a so-called "swarm intelligence." Therefore, all transport vehicles can build and/or update the entire map together very swiftly.

The control unit is in particular formed by an operation control of the transport vehicle, which ensures the traveling operation of the transport vehicle in accordance with its intended purpose.

Further of advantage is an advancement according to which the transport vehicle comprises a control unit having a memory means configured for storing a map of the travel area and/or of the at least one working area. When the transport vehicles move in areas where also persons may be located, there may time and again be a short-term congestion. Most of the time, however, this concerns very small-scale areas, as the detection of the travel path specification serves to prevent such agglomerations. The transport vehicles are configured for autonomous navigation and can make way for such local obstructions. To that end, it is of advantage if the transport vehicles know the layout, size and bounds of the travel area and/or of the at least one working area. Therefore, the transport vehicles can help dissolve local obstructions, and/or at least prevent them from increasing, by locally planning alternative routes. According to another possible embodiment, transport vehicles could exchange data via communication means of the control unit in order to dissolve, as "swarm intelligence," local obstructions and restore the transport capacity as quickly as possible, without the superordinate fleet management system (FMS) having to create new travel path specifications.

According to one advancement, it is also provided that the static workstation comprises a work desk, a holding area for buffering at least one source load carrier, a holding area for buffering at least one target load carrier and a user interface having an output device and an input device, and that the person is instructed, via the output device, to perform a processing step in accordance with the processing order on the article(s) which is/are removed from the source load carrier, and that the person is instructed, via the input device, to confirm a processing step, in particular the completion of a processing step or the depositing, after the processing step, of (an) article(s) into a target load carrier and suchlike.

This advancement is of advantage in particular with regard to an optimized workflow during the executing of the processing order, as the articles/load carriers are transported to, provisioned at and/or transported away from predefined holding areas by the transport vehicles. The definition of holding areas further has the advantage that the working area for the person is not limited by inbound-transporting, provisioning and/or outbound-transporting the article(s)/load carriers. The user interface is connected with the warehouse management system (WMS) via a connection line. The user interface receives the processing order to be carried out from the warehouse management system (WMS) and gives the operator pertinent instructions at the output device. The output device comprises, for example, a screen, loudspeaker and suchlike. The user interface transmits to the warehouse management system (WMS) confirmation signals for a processing order which is being carried out or has just been completed. The operator confirms the completion of the processing order, for example, or scans the article(s) for a processing operation, by a confirmation signal being issued, or a confirmation signal being acquired, at the input device. The input device comprises, for example, a keyboard, scanner and suchlike. Most of the time, the confirmation signal triggers a next process step.

The static workstation comprises the holding area for buffering at least one source load carrier and the holding area for buffering at least one target load carrier.

According to a first embodiment, the holding area for buffering at least one source load carrier and the holding area for buffering at least one target load carrier are respectively formed on the work desk.

To this end, on the one hand, the transport vehicle may comprise a transfer device, for example a conveying device, by means of which the article(s)/the load carrier is/are deposited onto the holding area or received by the holding area after the transport vehicle has been positioned next to the work desk.

To this end, on the other hand, one or multiple transfer device(s) may be assigned to the holding area for buffering at least one source load carrier, to which the transport vehicle is moved and at which the at least one source load carrier is transported, by the transfer device(s), from the transport vehicle onto the holding area. Equally, one or multiple transfer device(s) may be assigned to the holding area for buffering at least one target load carrier, to which the transport vehicle is moved and at which the at least one target load carrier is transported, by the transfer device(s), from the holding area onto the transport vehicle.

According to a second embodiment, the holding area for buffering at least one source load carrier is formed on an inbound delivery device and the holding area for buffering at least one target load carrier is formed on an outbound delivery device. On the one hand, a transport vehicle can be positioned at the inbound delivery device and the at least one source load carrier can be transported, at the inbound delivery device, from the transport vehicle onto the holding area by one or multiple transfer device(s). On the other hand, a transport vehicle can be positioned at the outbound delivery device and the at least one target load carrier can be transported, at the outbound delivery device, from the holding area onto the transport vehicle by one or multiple transfer device(s). According to this embodiment, the holding areas are therefore provided not on the work desk but on the inbound delivery device and outbound delivery device.

The inbound delivery device and outbound delivery device are designed as a combined inbound and outbound delivery device or as a separate inbound delivery device and outbound delivery device. Also, an alternating operation of the inbound delivery device and outbound delivery device is conceivable if they are designed essentially structurally identical. The same applies to the transfer device(s).

Yet, according to a third embodiment, it is also possible for a first transport vehicle to comprise the holding area for buffering at least one source load carrier and/or for a second transport vehicle to comprise a holding area for buffering at least one target load carrier. In this case, the first transport vehicle and/or second transport vehicle form a part of the static workstation and remain at the static workstation during the processing of at least one processing order. The provisioning of the source load carrier and/or target load carrier is accordingly done by the first transport vehicle and/or second transport vehicle.

According to one advancement, it is provided that the static workstation has a provisioning area or multiple provisioning areas configured for providing working means, in particular in an initial configuration step.

The working means is preferably transported using a working means load carrier, even though this is not mandatory. The provisioning area can also be understood to be a provisioning area for a working means load carrier. Working means are, for example, specific tools and auxiliary materials, such as packaging materials and suchlike.

According to a first embodiment, the provisioning area for working means is configured on the work desk.

To this end, on the one hand, the transport vehicle may comprise a transfer device, for example a conveying device, by which the (required) working means load carrier is deposited onto the provisioning area or the (no longer required) working means load carrier is received by the provisioning area after the transport vehicle has been positioned next to the work desk.

To this end, on the other hand, one or multiple transfer device(s) may be assigned to the provisioning area for working means, to which the transport vehicle is moved and at which the at least one (required) working means load carrier is transported, by the transfer device(s), from the transport vehicle onto the provisioning area. Equally, one or multiple transfer device(s) may be assigned to the provisioning area for working means, to which the transport vehicle is moved and at which the at least one (no longer required) working means load carrier is transported, by the transfer device(s), from the provisioning area onto the transport vehicle.

According to a second embodiment, the provisioning area for a (required) working means load carrier is formed on an inbound delivery device and the provisioning area for a (no longer required) working means load carrier is formed on an outbound delivery device. On the one hand, a transport vehicle can be positioned at the inbound delivery device and the at least one (required) working means load carrier can be transported, at the inbound delivery device, from the transport vehicle onto the provisioning area by one or multiple transfer device(s). On the other hand, a transport vehicle can be positioned at the outbound delivery device and the at least one (no longer required) working means load carrier can be transported, at the outbound delivery device, from the provisioning area onto the transport vehicle by one or multiple transfer device(s). According to this embodiment, the provisioning area(s) is/are therefore provided not on the work desk but on the inbound delivery device and outbound delivery device.

The inbound delivery device and outbound delivery device are designed as a combined inbound and outbound delivery device or as a separate inbound delivery device and outbound delivery device. Also, an alternating operation of the inbound delivery device and outbound delivery device is conceivable if they are essentially designed structurally identical. The same applies to the transfer device(s).

Yet, according to a third embodiment, it is also possible for the transport vehicle to comprise the provisioning area for working means. In this case, the transport vehicle forms a part of the static workstation and remains at the static workstation during the processing of at least one processing order. The provisioning of the (required) working means load carrier at the workstation is accordingly done by the transport vehicle.

Even though, in the embodiments described above, the working means load carrier is transported to the workstation and transported away from the workstation by an autonomous transport vehicle, it would generally also be conceivable that the working means load carrier is transported to the workstation and transported away from the workstation by a stationary conveying device.

It is also of advantage if the type of processing orders which can be carried out at this workstation is first defined by a and/or during the configuration step. The workstation is generally not committed to a specific activity. Accordingly, a simple re-configuration to a different type of processing order can be carried out, for example in order to be able to respond to seasonal order types.

Different processing orders which require different working means (utilities) can be handled at the workstations. For example, returns are handled at one workstation, and shipments of articles are gift-wrapped at another workstation.

It also proves of advantage if the control unit of (some of) the transport vehicles is configured for receiving and evaluating transport orders from the warehouse management system, and wherein the transport vehicles are automatically and autonomously controlled in accordance with these transport orders by a working means load carrier being transported to the workstation, or transported away from the workstation, for a third transport order of the transport orders. According to this advancement, the working means required at the workstations for executing the processing orders are transported from the transport vehicles to the workstations and are transported away from the workstations after finishing the type of the processing orders. It is also provided that working means used up during operation are replenished. It may also be provided that the working means is supplemented and/or replaced upon a change in a processing order or for capacity reasons.

An advancement also consists in that the workstation is configured locally variable. "Locally variable" is understood to mean that, in case of a change in the type of the processing orders, the workstations can be arranged at other positions in accordance with a changed configuration. This also enables process flows to be adapted to the changed processing orders. The workstations, however, are not mobile in the sense that they are freely movable, for example by the operator. The workstations are generally fixed and/or stationary, so that they are reliably held in position for the duration of the selected configuration. A re-configuration of the position of the workstations requires a shut-down of the working area to be re-configured.

According to another embodiment, it is provided that a unique identifier is stored in each navigation marker. The navigation markers may serve to directly define the absolute position—in this case, a navigation marker will directly contain a position specification. Yet it is also possible for the navigation markers to form merely a reference in an electronic map. In order to be able to determine the actual position of the navigation marker in the activity area, the identifier must be looked up in an electronic map of the activity area. In such an electronic map, it is in particular defined which navigation markers are assigned to a working area and/or to a travel area. Therefore, a defined configuration of the working areas and travel areas can be changed in a simple and swift manner by updating the electronic map.

According to one advancement, it is provided that navigation markers are arranged also in the working area, in particular on the floor of the working area, or that navigation markers are arranged in the activity area. The advantage lies in that the actual sub-division of the activity area into at least one working area and at least one travel area is simplified considerably, as, due to the presence of (a large number of) navigation markers, there are no and/or hardly any restrictions as to where the areas can be arranged. According to another embodiment, it may also be provided that navigation markers can be arranged in the entire (physical) space inside which the activity area is located. As a non-restrictive example, this embodiment may mean that navigation markers are arranged on the floor in the entire building, and therefore the activity area can be defined and adapted to the requirements of the processing orders utterly freely.

According to one advancement, it is provided that the travel path specification comprises a start and a target point inside the travel area and/or further comprises a plurality of navigation markers which are to be followed by the transport vehicle. The travel path is detected by the superordinate control system (warehouse management system or fleet management system), whereby the global traffic management (of all transport vehicles) can be carried out in an optimized manner. The individual transport vehicle receives the detailed travel path and need merely follow it by capturing the specified navigation markers. If the positions of the navigation markers are known, yet also the transport vehicle itself can take over control and therefore navigate autonomously for the most part. Knowing the current traffic situation as it can be provisioned by the traffic control system, for example, enables the transport vehicle to also independently detect alternative routes in order to optionally bypass an area of high vehicle density in this way.

One advancement consists in that a route section speed is stored in the travel path specification. In order to achieve a high throughput, the transport vehicles are operated at the maximum admissible speed most of the time. Yet this can become of disadvantage if a higher-than-average vehicle density and/or a congestion occur in more frequented travel areas. The travel path specification is detected by the control system (preferably the fleet management system), which has a complete overview of all other transport vehicles moving in the area of a travel path specification of a specific transport vehicle. It may therefore prove of advantage if the transport vehicles travel more slowly in one travel section along the travel path in order to proactively prevent too high a vehicle density in another travel section along the travel path and therefore increase the overall throughput. It should be noted in particular that the transport vehicles can also define the respective speed themselves, independent of/deviating from the travel path specification. In particular, the transport vehicle can analyze the local traffic situation and, on this basis, define the travel speed also lower than the maximum (specified) section speed.

In accordance with one advancement of the invention, it may be provided that the control unit of the transport vehicles is configured for receiving and evaluating transport orders from the warehouse management system, and wherein the transport vehicles are automatically and autonomously controlled in accordance with these transport orders by a source load carrier and/or a target load carrier being transported between a first workstation and a second workstation for a fourth transport order of the transport orders, wherein the start point and target point for a fourth transport order are formed by the first workstation and second workstation. Accordingly, articles/load carriers can be transported between workstations. Accordingly, the article(s) at a first workstation can be subjected to a first processing order and then transported to a second workstation by a transport vehicle, preferably using a load carrier, in order to be subjected, there, to a second processing order. This is the case, for example, if only some working means can be made available at a workstation.

One advantageous advancement also consists in that article(s) for a single processing order is/are located in the source load carrier, or that article(s) for a plurality of processing orders is/are located in the source load carrier. For example, a single article can be assigned to a processing order if this article is to be subjected to a specific action. Yet, it may equally be provided that a plurality of articles of the same type of article is located in the source load carrier which are assigned to one processing order. For example, it may be return articles which must be reprocessed before further actions can be carried out, for example the article(s) is/are stored in the article storage. It may also be provided that articles are located in the load carrier which are assigned to a plurality of processing orders (of the same type). In this case, it is irrelevant which article(s) is/are processed for which order, as the same processing order, for example a repacking of the article(s), is respectively carried out for each article. Yet it may generally also be provided that article(s) is/are located in the source load carrier which are not assigned immediately to a processing order and/or not assigned to a current processing order.

In the second travel section, transport vehicles can move up to a second maximum speed. This speed is so high that a safe stopping in front of a suddenly-appearing obstacle, for example a person stepping into the travel path, can no longer be ensured, and therefore the person might possibly get injured. Against this background, it is provided that the boundary is formed by a person access protection. This advancement ensures that persons cannot readily access the second travel area. The transport vehicles, in contrast, can pass the boundary at the at least one predetermined passing zone and transport the articles/load carriers to the/from the workstations.

In this respect, one advancement of the invention consists in that the person access protection is formed by a mechanical and/or a contactless barrier. A mechanical barrier comprises, for example, a grille anchored to the floor. A contactless barrier for capturing the presence of a person comprises, for example, a light curtain or a camera system having an evaluation unit.

It is also of advantage if the person access protection comprises a monitoring device configured for identifying an access by the person to the second travel section by passing the person access protection and for optionally generating a warning signal. The warning signal can comprise an optical/acoustic warning signal in order to indicate to a person the unauthorized access to the second travel section. Yet the warning signal can alternatively or additionally also comprise a control signal, with which the transport vehicles in the second travel section are controlled such that they are switched to a safety mode, for example the transport vehicles in the second travel section are stopped, or the travel speed is slowed down at least to the first maximum travel speed.

One advancement also consists in that the workstation comprises a work desk having a first side facing the operator and a second side facing the second travel section, wherein the second side forms the boundary. This advancement has two important advantages. On the one hand, the workstations can directly adjoin to the "faster" second travel area and the workstations can be supplied with a high transport throughput. This is in particular of advantage if processing orders which have short cycle-times are carried out at the workstations. On the other hand, the additional effort for the arrangement of a person access protection can be reduced substantially, as the workstations themselves, due to their structural features, form the access protection. For example, the workstations and/or the work desk can have structural means on the second side which reliably prevent a person from accessing the second travel area, for example, a wall, a grille or a bar may be arranged on the second side, preferably from the floor up to a height above the work desk.

According to another embodiment, it is provided that the second travel section surrounds the provisioning device at least in sections. In the second travel section, the transport vehicles can be operated at the second maximum travel speed, as no persons are located there (during normal operation). As described above, the provisioning device of the transport and manipulation system couples to a load carrier conveying system operated in an automated manner. Such a load carrier conveying system is in particular designed for a high transport throughput. The high transport throughput of the load carrier conveying system (high-performance conveying system) is divided between a plurality of autonomous transport vehicles which can equally be operated at the second maximum speed in the second travel section. The transport vehicles can optionally adapt the high transport throughput to the considerably lower performance requirement of manual workstations, wherein this is predominantly done by reducing the travel speed in the first travel section.

With regard to a route optimization, an advancement is of advantage according to which at least of one of the transport vehicles comprises a single loading plane configured for receiving at least two load carriers, or comprises loading planes arranged on top of one another each configured for receiving at least one load carrier, so that multiple load carriers can be transported simultaneously with the at least one transport vehicle. This enables the throughput capacity of the transport vehicles to be utilized in an optimal manner. The same transport throughput can be achieved with a lower number of transport vehicles.

For example, the planning of the travel orders can take into account different workstations which are to be called at by a transport vehicle. By slightly adapting the travel paths, the transport throughput can be increased considerably.

In accordance with one advancement of the invention, it is provided that the load carriers are formed by at least one source load carrier and at least one target load carrier assigned to a (single) processing order, or that the load carriers are formed by load carriers assigned to different processing orders. According to the first embodiment, any and all load carriers required for executing a processing order at a workstation are provisioned. According to the second embodiment, either source load carriers or target load carriers, or one source load carrier and one target load carrier each, can be transported for different processing orders.

For the purpose of a workflow optimization, it is further of advantage if the source load carrier is defined as target load carrier after the processing order has been carried out. In this case, the person puts the article(s) back into the load carrier after a processing order has been carried out, wherein the load carrier now forms the target load carrier.

It also proves of advantage if the transport and manipulation system further comprises a plurality of provisioning stations, wherein the control unit of the transport vehicles is configured for receiving and evaluating transport orders from the warehouse management system, and wherein the transport vehicles are automatically and autonomously controlled in accordance with these transport orders by at least one target load carrier, in particular an empty target load carrier, being picked up at one of the provisioning stations and transported to one of the workstations and provisioned at this workstation, for a fifth transport order of the transport orders, in order to subsequently execute a processing order at this workstation. By way of example, a processing order may consist in re-processing and separating a plurality of provisioned articles. In this case, a target load carrier which is empty most of the time is provisioned at the workstation each time. According to another possible embodiment, it may also be provided that the transport vehicle provisions the target load carrier and outbound-transports it in accordance with a transport order after the person has placed the article(s) on the target load carrier.

The object of the invention is also achieved by a method for transporting load carriers and for executing manual processing orders in a transport and manipulation system comprising at least one activity area, the at least one activity area having
- a provisioning device with a takeover station and a handover station,
- at least one working area, in which a plurality of static workstations for manually executing processing orders are arranged by persons, and
- at least one travel area, in which a plurality of autonomous transport vehicles can move and which connects the provisioning device with the workstations, the method comprising the steps:
- acquiring transport orders at a warehouse management system,
- transmitting the transport orders from the warehouse management system to control units of the autonomous transport vehicles, wherein a transport order defines the travel path of a transport vehicle between a start point and a target point inside the at least one travel area, wherein the start point is formed at the takeover station or one of the workstations and the target point is formed at the handover station or one of the workstations,
- evaluating a start point and a target point inside the travel area from the transport order for the respective transport vehicle by the control unit of the respective transport vehicle,
- picking up a load carrier onto the transport vehicle at the start position,
- transporting the load carrier to the target position along a travel path defined by the transport order using the transport vehicle by capturing and evaluating navigation markers at the control unit of the respective transport vehicle, and
- depositing the load carrier at the target position.

The transport vehicle is moved along the travel path at a first maximum travel speed in a first travel section and at a second maximum travel speed in a second travel section, wherein the second maximum travel speed is higher than the first maximum travel speed, and wherein the second travel section is bounded against the first travel section by a boundary which can be passed by the transport vehicles at at least one predetermined passing zone (only).

At any rate, this ensures the safety of persons in the first travel area, while the transport vehicles can move at a higher travel speed in the second travel section in order to achieve as high a transport throughput as possible.

It is also of advantage if the transport vehicle autonomously travels to the start position after a transport order has been evaluated. In knowledge of, and taking into account, the current position, the transport vehicle can travel to the specified start position. Most of the time, the (new) transport orders are transmitted to the transport vehicles asynchronously to the processing status of the transport orders.

It may also prove of advantage if, upon the person accessing the second travel section from the first travel section by passing the boundary, the second maximum travel speed is defined as equal to the first maximum travel speed.

In particular, the person access protection may comprise a monitoring device, which is configured for identifying an access by the person to the second travel section by passing the person access protection and for optionally generating a warning signal, as described above. This warning signal is transmitted, for example, to the warehouse management system, which evaluates the signal and transmits a control signal and/or a travel path specification to the transport vehicles in the second travel section concerned, so that the transport vehicles are switched to a safety mode, for example, the second maximum travel speed is defined as the first maximum travel speed, so that the transport vehicles are temporarily moved at the first travel speed, at the maximum, also in the second travel section. Accordingly, also in case of unauthorized access by the person to the second travel section from the first travel section, the safety of persons is ensured. Such a measure according to the method is of advantage, as the operation is maintained and need not be stopped. After the person has exited the second travel section, the second maximum travel speed can again be activated/cleared in the second travel section. According to another possible embodiment, also an independent safety specification can be transmitted to the transport vehicles in order to transmit the speed specification.

A reliable transport of articles/load carriers is achieved if, during transitioning from the first travel section to the second travel section and vice versa, the travel speed of the respective transport vehicle is gradually adjusted. Abrupt changes in speed are avoided. Further, rapid acceleration and peaks in energy consumption are avoided, which proves favorable in particular for battery-operated transport vehicles.

In order to achieve as high a transport throughput as possible in the second travel section, it is provided, according to one advancement, that the transport vehicles in the second travel section move predominantly along straight-lined travel paths. The further a transport vehicle can travel following a straight path, the higher the second travel speeds can be defined. For example, this may be provided in order to service workstations located remote from the provisioning device.

One advancement also consists in that the at least one travel area and/or the at least one working area is defined inside the activity area in a configuration step, in particular by allocation of navigation markers to the at least one travel area and/or to at least one working area. The configuration step can be done in the course of the initial start-up of the transport and manipulation system. If a demand for another configuration arises during operation, the existing configuration can be canceled, and a new configuration can be defined in a renewed configuration step.

Definitions of the terms used can be found below.

"Navigation markers" are understood to mean stationary elements by which a position inside the activity area can be clearly defined. A navigation marker can, itself, contain the position specification, or it forms a reference in an electronic map of the activity area. Preferably, the action markers are arranged and/or configured such that they are captured by the transport vehicles on a regular basis during their movement in accordance with their intended purpose inside the travel area.

A "transport vehicle" is understood to mean a vehicle moving autonomously which is able to deviate from a travel path received from the control system by capturing navigation markers and moving along the travel path. The transport vehicle comprises a chassis, a drive control, a travel drive, an energy storage and (optionally) at least one loading platform arranged on the chassis for receiving/depositing/ transporting one/multiple article(s) and/or one/multiple load carrier(s). Finally, the transport vehicle may also comprise sensors for capturing the surroundings of the autonomous transport vehicle and for spatial orientation. The chassis is equipped with wheels, of which at least one of the wheels is coupled with the travel drive and at least one of the wheels is steerable. Also both wheels can be coupled with the travel drive and driven by it. The transport vehicle may comprise four wheels, two of which wheels are steerable. The drive control comprises a data processing unit in order to evaluate the travel path specification and the captured navigation markers and control the travel drive.

It may also be provided that a transport vehicle receives a travel path specification and follows it by capturing the navigation markers, yet, while doing so, can adjust, to a limited extent, its travel path in order to make way for an obstacle, for example. According to another embodiment, the transport vehicle can receive only a start and a target position as travel order, while the specific travel path planning is done by the transport vehicle, wherein a control system can make corrective interventions, however.

A "warehouse management system" (WMS) is understood to mean a computer system on which the processing orders are acquired.

A "processing order" is electronically acquired and processed by the "warehouse management system" as a data set. In accordance with the invention, such processing orders do not comprise picking orders, however. Accordingly, they are orders different from picking orders, namely so-called processing orders. For instance, a processing order may follow a picking order as soon as one or multiple order lines have been picked for this picking order. A picking order comprises one or multiple order lines, wherein each order line specifies respectively (an) (ordered) article(s) according to its/their type of article and its/their number of pieces (ordered).

The processing orders comprise in particular one or multiple value added services, for example packaging, disposing of, labeling, adding a package insert or an invoice to the article(s) and suchlike, or re-processing return articles or quality controlling (an) article(s), for example a visual inspection of (a) return article(s), or a repacking order or a replenishment order. A repacking order refers to articles, for example in the article receiving area, having to be repacked from an inbound delivery bundle onto load carriers. A replenishment order refers to the filling of the load carrier with articles.

In the article receiving area, also parameters (dimensions, weight, density and suchlike) for the articles can be acquired and stored as article master data in a storage module of the "warehouse management system."

"Load carrier" is understood to mean a container, cardboard box, tray, hanging bag and suchlike. Depending on the embodiment of the load carrier, the article(s) can be arranged in the load carrier if it is configured, for example, as a container, cardboard box or hanging bag, or be arranged on the load carrier if it is configured, for example, as a tray.

"Article(s)" is understood to mean, in particular, (an) article(s) for a consignment, return article(s) for a consignment or (a) replenishment article(s) (stock item(s)).

A "fleet management system" (FMS) is understood to mean a computer system which generates transport orders and travel path specifications for the transport vehicles (AMR). The "fleet management system" can communicate with the "warehouse management system" and transmit data, in particular the processing orders acquired using data technology. On the other hand, the "warehouse management system" may also comprise the "fleet management system." In particular, the "fleet management system" comprises an order management system, which assigns the respective travel orders to the individual transport vehicles. Further, the "fleet management system" comprises a traffic management system, which holds current traffic information (traffic density, accumulation points, areas with disruptions, etc.) and which makes the traffic information available to the order management system for its travel path planning and/or optionally makes corrective interventions. Knowledge of the transport tasks to be carried out and knowledge of a current position of the transport vehicles enables this traffic control system to also detect the future positions of the transport vehicles and to take this into account when generating the travel path specifications and to plan the travel paths so as to prevent any local accumulations of transport vehicles. In particular, the travel paths may also be planned such that a congestion is later prevented.

The "provisioning device" comprises a takeover station and a handover station, wherein, at the takeover station, a load carrier, in particular a source load carrier or optionally an empty target load carrier, is picked up from the takeover station onto a transport vehicle and, at the handover station, a load carrier, in particular a target load carrier, is deposited from a transport vehicle onto the handover station. The takeover station is formed, for example, by a holding location on the load carrier conveying system. The handover station is formed, for example, by a holding location on the load carrier conveying system.

The takeover and handover of the article(s)/load carrier between the takeover station/handover station and the transport vehicle is done by a transfer device operated in an automated manner. The takeover station/handover station can comprise this transfer device, for example a pusher. On the other hand, also the transport vehicle can comprise this transfer device, for example a conveying device. Equally, the transfer device can also comprise an article handling device and/or load carrier handling device, for example a robot (jointed-arm robot or gantry robot) having a gripper.

It should be noted in this context that a target load carrier which has been transported from a workstation to the handover station and deposited onto the handover station is transported from the provisioning device to the article issue area by the load carrier conveying system.

BRIEF DESCRIPTION OF THE DRAWINGS

For the purpose of better understanding of the invention, it will be elucidated in more detail by the figures below.

FIG. 1 shows a first embodiment of a transport and manipulation system, in a top view;

FIG. 2 shows a second embodiment of a transport and manipulation system, in a top view;

FIGS. 3a, 3b show a view of various embodiments of a boundary between a first travel section and second travel section;

FIG. 4 shows an activity area with a possible arrangement of navigation markers;

DETAILED DESCRIPTION OF THE PREFERRED EMBODIMENTS

Figure 5:
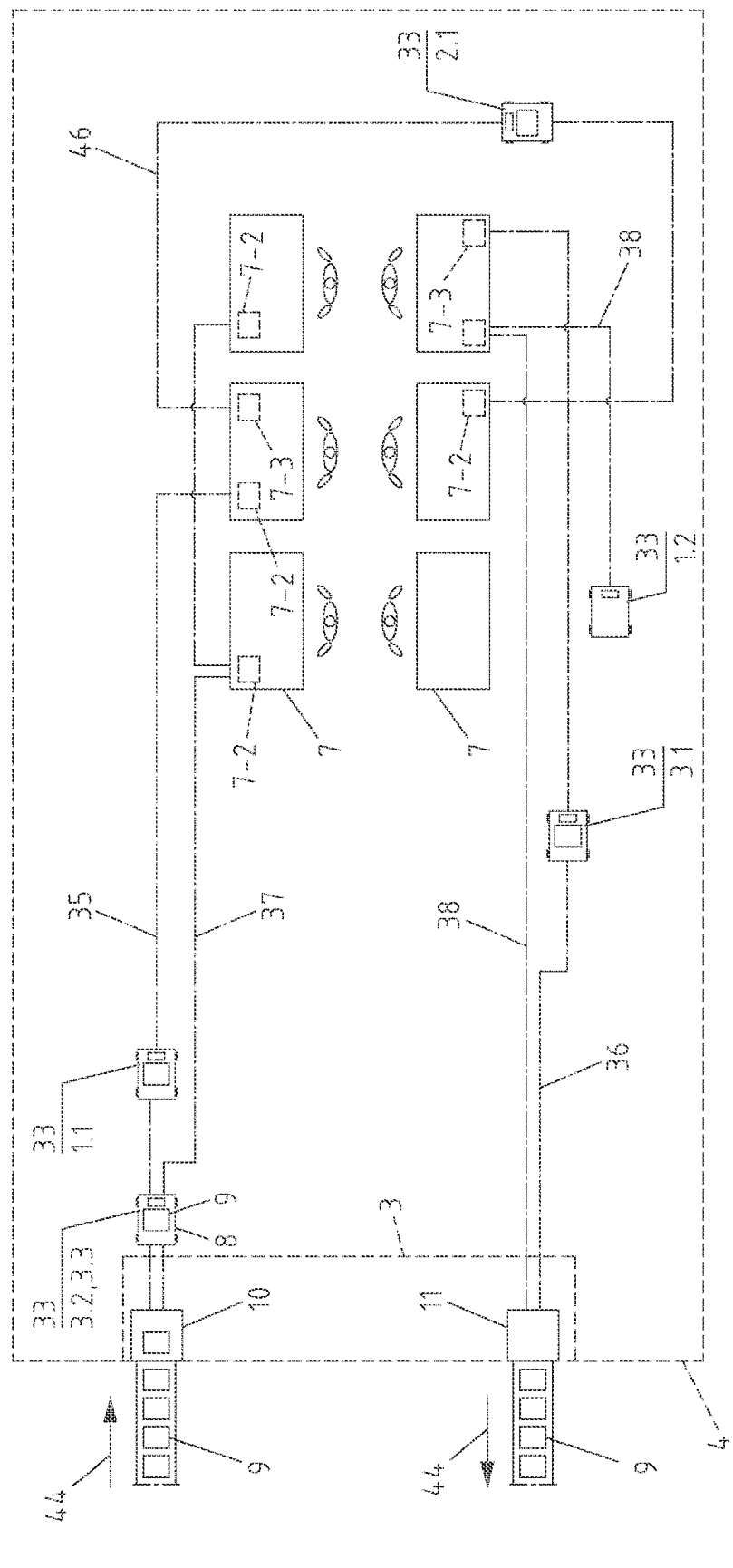
FIG. 5 shows a schematic representation for the processing of transport orders and their travel paths.

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows a first embodiment of a transport and manipulation system 1, a provisioning device 3 of which adjoins a load carrier conveying system 2 operated in an automated manner.

The load carrier conveying system is a stationary load carrier conveying system. Usually, the load carrier conveying system is also adjoined by an article receiving area, article issue area, article storage for storing articles having load carriers and a picking system having one or multiple picking workstations for automatically/manually executing picking orders, as described, for example, in the international publication WO 2018/006112 A1 or international application PCT/AT2019/060077.

As marked in dashed lines in FIG. 1, the transport and manipulation system 1 is defined inside an activity area 4. The provisioning device 3 is arranged in the activity area 4, and the load carrier conveying system 2 abuts on the activity area 4.

The transport and manipulation system 1 may also comprise a (optional) schematically marked provisioning station 45, at which empty target load carriers 9 are provisioned. Yet, alternatively, the empty target load carriers 9 can also be provisioned at the provisioning device 3, in particular at a takeover station 10.

According to the embodiment shown, the activity area 4 comprises
- a travel area 5, in which a plurality of autonomous transport vehicles 8 can move and which connect the provisioning device 3 with workstations 7, and
- a working area 6, in which a plurality of static workstations 7 for manually executing processing orders by persons 15 (operators) are arranged.

Yet, generally, the activity area 4 may comprise more than one travel area 5 and more than one working area 6.

The provisioning device 3 comprises a takeover station 10 and a handover station 11. According to the embodiment shown, the takeover station 10 and handover station 11 are arranged separately. Generally, the takeover station and handover station can also be combined and formed by a single takeover and handover station.

The takeover station 10 and handover station 11 respectively comprise a holding location, on which a load carrier 9 can be deposited. On the one hand, the takeover station 10 and handover station 11 can immediately adjoin the load carrier conveying system 2. On the other hand, the load carrier conveying system 2 may also comprise the takeover station 10 and handover station 11.

The load carrier conveying system 2 comprises a conveying device for transporting load carriers 9 to the takeover station 10, see arrow 44 from left to right, and a conveying device for transporting load carriers 9 away from the handover station 11, see arrow 44 from right to left. The load carriers 9 are containers or cardboard boxes, for example.

The transport vehicle 8 can take over a load carrier, in particular a source load carrier, from the takeover station 10, or the transport vehicle 8 can deposit a load carrier, in particular a target load carrier, to the handover station 11.

The transport vehicles 8 each comprise a control unit 39, which is configured for receiving and evaluating transport orders from a warehouse management system 29 (see FIG. 5). The autonomous control of the transport vehicles 8 is taken over by the respective control unit 39, which is configured for selectively controlling a travel drive (not represented) in order to thus be able to follow a specific travel path. The transport vehicles 8 can further respectively comprise a sensor, which is connected to the control unit 39 in order to identify obstacles on the way and trigger an action on this basis. In particular, the control unit 39 must ensure that there is no collision between the transport vehicles 8 or with an obstacle.

In particular, the transport vehicles 8 can be automatically and autonomously controlled in accordance with the transport orders and in such a manner that
- a source load carrier 9 is picked up at the takeover station 10, transported to one of the workstations 7 and provisioned at the one of the workstations 7, at least for a first transport order of the transport orders, in order to subsequently execute a processing order at this workstation 7, and/or
- a target load carrier 9 is picked up at one of the workstations 7, transported to the handover station 11 and deposited at the handover station 11, at least for a second transport order of the transport orders, after a processing order has been completed at this workstation 7, and/or
- a working means load carrier is transported to the workstation 7 or transported away from the workstation 7, at least for a third transport order of the transport orders, and/or
- a source load carrier 9 and/or a target load carrier 9 is transported between a first workstation 7 and a second workstation 7, at least for a fourth transport order of the transport orders, wherein the start point 26 and target point 27 for a fourth transport order are formed by the first workstation 7 and second workstation 7, and/or
- at least one target load carrier 9, in particular an empty target load carrier, is picked up at the provisioning station 45 and transported to one of the workstations 7 and provisioned at the one of the workstations 7, at least for a fifth transport order of the transport orders, in order to subsequently execute a processing order at this workstation 7.

The control unit 39 comprises a memory means not represented in more detail, in which a map of the navigation markers 19 and/or a map of the at least one travel area 5 and/or of the at least one working area 6 is stored.

As can be seen in FIG. 1, the travel area 5 is sub-divided into a first travel section 12 and a second travel section 13. This is achieved by the second travel section 13 being bounded against the first travel section 12 by a boundary 14, which can be passed by the transport vehicles 8 at at least one predetermined passing zone 17 (only). The first travel section 12 protrudes into the at least one working area 6. Persons 15 are allowed to move inside this working area 6. The second travel section 13 couples to the provisioning device 3. In particular, it is of advantage if the second travel section 13 surrounds the provisioning device 3 at least in part.

When the transport vehicles 8 in the first travel section 12 are moving, a first maximum travel speed is defined for them. When the transport vehicles 8 in the second travel section 13 are moving, a second maximum travel speed is defined for them. The second maximum travel speed is higher than the first maximum travel speed. In particular, the first maximum travel speed can also be referred to as a travel speed "which is safe for persons." In this context, "safe for persons" means that the person 15 is not exposed to any dangerous injury risk if s/he were to collide with a transport vehicle 8. The first maximum travel speed and/or the second maximum travel speed can be defined by the warehouse management system 29.

This embodiment enables persons 15 and transport vehicles 8 to jointly operate in the first travel section 12, as the transport vehicles 8 move at a first travel speed (first maximum speed=safety speed), at the maximum, which ensures a safe stopping of the transport vehicle 8 in front of a suddenly-appearing obstacle. In the second travel section 13, the transport vehicles 8 can move at a higher maximum travel speed (second maximum speed), as persons 15 are not simultaneously located in the second travel section 13. This is ensured by the boundary 14. Therefore, a safety speed is not required in the second travel section 13, as the transport vehicles 8 need not reckon with suddenly-appearing obstacles. It is, however, of advantage if the actual travel speed of the transport vehicles 8 is selected in accordance with the current traffic volume and/or that it can be defined by the travel path specification.

Usually, the load carrier conveying system 2 described above is distinguished by a high transport throughput (high transport capacity), which, however, is generally not required for the manual workstations 7. Typically, such a load carrier conveying system 2 can be used to transport several hundred load carriers 9 per hour. At the individual manual workstation 7, less than ten load carriers 9 per hour are typically required. The advantage of the embodiment consists in that the load carrier conveying system 2 can work at its "typical" transport throughput, as the autonomous transport vehicles 8 are allowed to move at their high second maximum travel speed in the second travel section 13 abutting on the provisioning device 3. Accordingly, the takeover station 10 and handover station 11 can be called at highly frequently by the autonomous transport vehicles 8.

The transport and manipulation system 1 described ensures that the high transport throughput can be distributed over the "surface area" by the provisioning device 3. The high transport throughput is divided by the (individual) provisioning device 3 between a plurality of autonomous transport vehicles 8. Even if there are multiple takeover stations 10 and/or handover stations 11, the high transport throughput can be seen as a point-shaped source or sink, whereas the required transport throughput at the workstations 7 is distributed over a large surface area—hence the term of distributing the transport throughput over the surface area.

The travel area 5 is represented by the solid line in FIG. 1. It is defined, for example, by a physical barrier or by a bound. This bound is preferably a logical bound, which is defined, for example, by the navigation markers. The transport vehicles 8 can move freely inside the travel area 5.

A workstation 7 can generally be configured such that a wide variety of processing orders can be carried out. For example, at one of the workstations 7, the processing orders "packaging a consignment" and "enclosing a prospectus with the consignment" can be carried out.

To this end, the static workstations 7 comprise a work desk 7-1, a holding area 7-2 for buffering at least one source load carrier 9, a holding area 7-3 for buffering at least one target load carrier 9 and (optionally) a user interface 7-4 having an output device and/or an input device.

The person 15 can be instructed, via the output device of the user interface 7-4, to perform a processing step in accordance with the processing order on the article(s) which is/are removed from the source load carrier 9. In the example, the article(s) is/are identical with the consignment which is to be packaged and with which a prospectus is to be enclosed. The person 15 can be instructed, via the input device of the user interface 7-4, to confirm a processing step.

The output device can be formed, for example, by a screen, on which a description of the actions of the processing order to be carried out is represented. The input device can be formed, for example, by a keyboard, a confirmation button or a scanning device, with which the person 15 can confirm, among other things, the completion of the processing order. For reasons of better clarity, the holding area 7-2 for buffering at least one source load carrier 9, the holding area 7-3 for buffering at least one target load carrier 9 and the user interface 7-4 are represented at one workstation 7 only.

The processing order may also comprise, for example, a quality control, where each article is checked by a visual inspection, etc.

The static workstation 7 may further have at least one provisioning area 40 for working means, on which working means are provisioned in an initial configuration step. "Working means" is understood to mean tools and/or auxiliary materials, such as packaging materials.

According to a first embodiment, the holding area 7-2 for buffering at least one source load carrier 9 and the holding area 7-3 for buffering at least one target load carrier 9 is formed on the work desk 7-1 at one of the workstations 7 in FIG. 1. As not represented in more detail, the transport vehicle 8 may comprise a transfer device, for example a conveying device, by means of which the source load carrier 9/target load carrier is deposited onto the holding area 7-2 or received by the holding area 7-3 after the transport vehicle 8 has been positioned next to the work desk 7-1.

According to a second embodiment, the holding area 7-2 for buffering at least one source load carrier 9 is formed on an inbound delivery device 7-5 and the holding area 7-3 for buffering at least one target load carrier 9 is formed on an outbound delivery device 7-6 at one of the workstations 7 in FIG. 1. The inbound delivery device 7-5 and outbound delivery device 7-6 are arranged laterally next to the work desk 7-1, as marked in dash-dotted lines.

The inbound delivery device 7-5 and outbound delivery device 7-6 are designed separate as inbound delivery device and outbound delivery device. On the other hand, the inbound delivery device 7-5 and outbound delivery device 7-6 can also be designed as combined inbound and outbound delivery device. Also, an alternating operation of the inbound delivery device and outbound delivery device is conceivable if they are designed essentially structurally identical.

In addition, a transfer device 7-7 is provided per inbound delivery device 7-5 and a transfer device 7-8 is provided per outbound delivery device 7-6.

A source load carrier 9 can be switched automatically, by the transfer device 7-7, between the transport vehicle 8 and the inbound delivery device 7-5. A target load carrier 9 can be switched automatically, by the transfer device 7-8, between the transport vehicle 8 and the outbound delivery device 7-6.

While the transfer devices 7-7, 7-8 are arranged separate according to the embodiment shown, the transfer device 7-7 and transfer device 7-8 can also be designed as combined transfer device 7-7, 7-8. Also, an alternating operation of the transfer devices 7-7, 7-8 is conceivable if they are designed essentially structurally identical.

According to an embodiment not shown, the transport vehicle 8 may comprise a transfer device, for example a conveying device, by means of which the source load carrier 9/target load carrier is deposited onto the holding area 7-2 or received by the holding area 7-3 after the transport vehicle 8 has been positioned next to the inbound delivery device 7-5/outbound delivery device 7-6. In this case, the transfer devices 7-7, 7-8 shown are not required.

It should be noted in this context that the workstations 7 need not necessarily be structured identically. In particular, the user interface 7-4 having the output device and/or the input device is optional. This is the case, for example, when always the same processing order is to be executed at a workstation, and a confirmation input is not required. If the user interface 7-4 is provided, it may also comprise merely the input device. In this case, the processing order may comprise, for example, a re-packing order where each article is to be placed into a target load carrier separately.

As can be seen in FIG. 1, the boundary 14 may comprise a physical barrier. The physical barrier is a grille, for example. The boundary 14 can be passed by the transport vehicles 8 with or without load carriers 9 at a single passing zone 17 or multiple passing zones 17. In contrast, the boundary 14 is to (physically) prevent the access to the second travel section 13 from the first travel section 12 for a person 15. It may also be provided that a touching of this barrier by a person 15 can be identified. Expediently, however, a person 15 cannot pass this/these passing zone(s) 17.

The provision of a physical barrier has the advantage that large-scale monitoring devices will be obsolete, as a person 15 cannot reach the second travel section 13.

According to one possible embodiment, a capturing means 18 is provided in the area of the passing zone(s) 17, which capturing means 18 can identify an unauthorized crossing by a person 15.

The passing zone(s) 17 can be designed such that there is a passageway 20 for the passing of the transport vehicles 8 in the boundary 14, in particular in the barrier, as can be seen in FIGS. 3a and 3b. Even if the transport vehicle 8 is smaller than a person 15, a person 15 could still try to access the second travel section 13. Such an access violation of the safety area can then be identified by the capturing means 18. In this case, the transport vehicles 8 in the second travel section 13 can be controlled by the fleet management system (FMS) such that they are switched to a safety mode (safety operation). For example, the transport vehicles 8 are stopped in the second travel section 13, or the travel speed is slowed down to at least the first maximum travel speed, so that the transport vehicles 8 move at the first maximum travel speed, at the maximum, also in the second travel section 13, and therefore the safety of persons is ensured. This safety mode is maintained until such time as the person 15 has left the second travel section 13.

According to another possible embodiment, it may also be provided that the capturing means 18 is configured for temporarily activating a safety mode in the second travel section 13 if a person 15 desires (planned) entry into the second travel section 13, for example in order to be able to execute servicing activities without the operation of the transport vehicles 8 having to be suspended.

As marked in FIG. 1, it may also prove of advantage if the second travel section 13 forms straight-lined travel paths 16, along which the transport vehicles 8 are moved predominantly. In this way, workstations 7 located remote from the provisioning device 3 can be supplied with high transport throughput.

FIG. 2 shows a second embodiment of a transport and manipulation system 1, which differs from the first embodiment essentially in the arrangement of the workstations 7 and boundary 14.

The workstations 7 are arranged at mutual distance and in parallel rows. An aisle (walkway) is formed between the workstations 7.

The work desk 7-1 of each workstation 7 forms a first side 41 facing the operator 15 and a second side 42 facing the second travel section 13, wherein the second side 42 of the work desks 7-1 forms a partial section of the boundary 14 between the first travel section 12 and the second travel section 13.

The advantage of this embodiment lies, in particular, in that a physical barrier as an additional boundary 14 is structurally required essentially only at each of the ends of the aisle and between the rows of workstations 7. If the workstations 7 are lined up against a building wall (not represented), a physical barrier as an additional boundary 14 is structurally required essentially only at one of the ends the aisle and between the rows of workstations 7. At the longitudinal sides of the workstations 7, an additional physical barrier as a structural boundary is obsolete, as it already exists in the form of the arrangement and formation of the work desks 7-1. In this regard, the work desks 7-1 may have a rear panel, for example, so that a climbing over or a crawling through is prevented.

The aisle between the parallel rows of workstations 7 forms the first travel section 12, where the persons 15 and the autonomous transport vehicles 8 are located and move simultaneously. Here, again, the first maximum travel speed "which is safe for persons" applies to the transport vehicles 8, as a safe stopping in front of a person 15 must be ensured.

It may be provided that the transport vehicles 8 follow the received travel path specification by capturing navigation markers. This embodiment also comprises, for example, that navigation markers 19 are arranged at the transition between the first travel section 12 and second travel section 13, which are captured by the transport vehicle 8 while passing, whereby the first maximum travel speed or the second maximum travel speed, depending on the travel direction, is defined.

The additional boundary 14 between the first travel section 12 and the second travel section 13 comprises, once again, a passing zone 17 which can be passed by the transport vehicles 8. As can be seen in FIG. 2, workstations 7 can be arranged in a row also at mutual distance, so that a passing zone 17 is formed between the workstations 7.

Especially in large-scale working areas 6, the arrangement of multiple passing zones 17 has proven an advantage, as the traffic volume of the transport vehicles 8 is divided between multiple passing zones 17, and the transport vehicles 8 can reach the second travel section 13 earlier and/or more often. Equally, in the area of the passing zones 17, capturing means 18 are preferably arranged once again in order to be able to identify an unauthorized crossing by a person 15. As described above, the transport vehicles 8 can be switched to a safety mode, provided that the capturing means 18 capture a person.

FIGS. 3a and 3b show different embodiments of a passing zone 17 as it has been described above.

FIG. 3a shows a first embodiment of a passing zone 17, which is configured for letting pass one transport vehicle 8 only. In this case, the passing zone(s) 17 is/are designed such that there is a passageway 20 in the boundary 14, in particular the barrier, for the transport vehicles 8 to pass. Should a person try to pass the passing zone 17, this is captured by a capturing means 18 and the transport vehicles 8 in the second travel section 13 are switched to a safety mode, for example, i.e. a safety travel operation is activated. Yet it may also be provided that an emergency stop of all transport vehicles 8 in the second travel section 13 is triggered upon identification of an access violation.

FIG. 3b shows a second embodiment of a passing zone 17, which is configured for letting pass a transport vehicle 8 and a person 15. In this case, the passing zone(s) 17 is/are designed such that the boundary 14, in particular the barrier, comprises a passageway 20, which is closable, in the upper region, by a physical barrier 21 and is configured, in the lower region, for the unimpeded passing (traveling through) of the transport vehicles 8. The physical barrier 21 can be formed by a temporarily removable (detachable) grille or a door.

As described above, the capturing means 18 can capture an unauthorized access attempt through the lower region of the passageway 20. In particular, the capturing means 18 will be configured, however, to enable an authorized access. For example, a person 15 can open and/or remove the barrier 21 and thus gain an authorized access to the second travel section 13. As already described, a safety mode is then activated in the second travel section 13. The safety mode is preferably canceled by closing and/or attaching the barrier 2.

A particular embodiment of a transport vehicle 8 is also shown in FIGS. 3a and 3b. This transport vehicle 8 comprises loading planes arranged on top of one another 43, on which respectively at least one load carrier 9 can be received, so that the transport vehicle 8 can be used to transport multiple load carriers 9 simultaneously.

Yet the transport vehicle 8 can also form a single loading plane 43, on which at least two load carriers 9 can be deposited, so that also this transport vehicle 8 can be used to transport multiple load carriers 9 simultaneously, as this is not represented in more detail, however.

The load carriers 9 transported simultaneously can relate to a source load carrier and a target load carrier for one processing order or source load carriers for different processing orders etc. This embodiment enables the transport efficiency of the transport vehicles 8 to be increased.

Generally, the transport vehicle 8 can also form a single loading plane 43, on which a single load carrier 9 can be deposited, so that this transport vehicle 8 can be used to transport exclusively one load carrier 9, as this is not represented in more detail, however.

The embodiments of the transport and manipulation system 1 described above can also utilize different transport vehicles 8.

FIG. 4 shows an overview of a transport and manipulation system 1. The transport and manipulation system 1 is arranged in a building or a hall (i.e. a closed space). Inside this space, the activity area 4 is defined. As already described above, this activity area 4 comprises at least one travel area 5 and at least one working area 6. For reasons of better clarity, individual details such as the travel sections 12, 13, the other transport vehicles 8 and the other workstations 7, for example, are not represented in FIG. 4.

It is provided that the transport vehicles 8 receive a transport order from a warehouse management system (WMS) and transport the load carriers 9 according to the transport order, for example between a takeover station 10 and a workstation 7, a handover station 11 and a workstation 7, between different workstations 7 etc. For example, a transport order for a transport vehicle 8 may consist in picking up a target load carrier 9 at a workstation 7 and transporting the target load carrier 9 to the handover station 11 and depositing the target load carrier 9 at the handover station 11.

It is further provided that the transport vehicles 8 receive a travel path specification 25 and follow it by capturing and evaluating navigation markers 19. This travel path specification 25 is detected by the warehouse management system (WMS) or a fleet management system (FMS), as the latter has an overview of all transport vehicles 8 located in the travel area 5 and can therefore plan an optimal travel path. Optimal in the sense that as few blockages and/or congestions as possible occur, which would reduce the throughput. The transport vehicles 8, while having their own intelligence in order to be able to respond to local requirements such as a possible collision, for example, cannot perform a route planning.

In order to enable navigation in the travel area 5, there are navigation markers 19 in the travel area 5, and/or the travel area 5 is defined by navigation markers 19.

In accordance with one embodiment, these navigation markers 19 may be formed by structural features of the surrounding space, i.e. of the building and/or the hall. The structural features can be structural elements 22 of the building, such as support structure elements or characteristic structural elements of the building. Further, these structural features may also be formed by design elements 23, for example by windows or doors. These structural elements are stationary structural elements, which are easily visible for the autonomous transport vehicles 8. The transport vehicles 8 preferably comprise a sensor, in particular optical sensor, and an image processing device in order to capture the structural features as navigation markers in a captured image of the surroundings. For better and safer detection of the navigation markers 19 in the space, it is of advantage, according to another embodiment, if the structural features have an identifier which can be clearly captured and evaluated. For example, the structural features can be designed in different colors, so that a transport vehicle 8 can quickly and clearly detect its position in the space. The structural features can also be formed by elements of the workstations 7 and/or of the working areas 6, or also by the number of the workstations 7 to be followed. In accordance with this embodiment, all clearly identifiable features existing in the activity area 4 and/or in the building space can serve as navigation markers 19.

It may also be provided that the navigation markers 19 are formed by navigation features 24 which are arranged in the travel area 5, and optionally also in the working area 6, in particular, in accordance with a preferred embodiment, on the floor of the travel area 5 and working area 6. In FIG. 4, these navigation features 24 are represented, only by way of example, in a small region of the activity area 4. It should be understood that the navigation features 24 are and/or can be arranged in other regions of the activity area 4.

In accordance with one preferred embodiment, these navigation features 24 are formed by markers which can be captured optically, for example by 1D or 2D codes. This enables the transport vehicle 8, while following the travel path, to always capture the closest navigation features 24 and prepare the further travel path. It may be provided that an absolute position of the feature and/or a unique identifier is stored in each navigation feature 24. This has the particular advantage that each transport vehicle 8 can determine its position in the activity area 4 without consulting a superordinate warehouse management system (WMS).

A start position 26 and a target position 27 is stored in the travel path specification 25 received by the transport vehicle 8. Further, navigation markers 19 which are to be followed along the travel path 28 are stored. In order to prevent local accumulations of transport vehicles 8, the travel path specification 25 can specify an exact chain of the navigation markers 19 to be followed. Or only characteristic navigation markers 19 are specified and the navigation between them is left up to the transport vehicle 8.

FIG. 5 shows an exemplary handling of processing orders using the transport and manipulation system 1. Orders 30 are acquired, using data technology, in a superordinate warehouse management system 29. The orders may comprise customer orders, for example, in which the (order) articles require an additional manual action prior to being dispatched. The orders 30 can also relate to the handling of returns, for example, in which the (return) articles must be "reprocessed" prior to being stored in the article storage or prior to being picked again.

It may optionally be required that the articles for orders are to be specially packaged, for example in a gift wrapping or in a breakage-proof packaging, before being dispatched, or that a package insert or an invoice must be additionally enclosed with the articles for orders.

FIG. 5 is a highly simplified representation of the transport and manipulation system 1 and of the method carried out by it, in particular relating to the processing of the orders 30.

The orders 30 are divided into order lines 31 by the warehouse management system (WMS) and/or a fleet management system (FMS), as a specific treatment is optionally required for each order line. With this division, the warehouse management system (WMS)/fleet management system (FMS), most of the time, also carries out a sequencing of the order lines in order to make optimal use of the capacity of the transport and manipulation system 1 at issue. When creating this sequence, the current capacity utilization of the workstations 7 and of the transport vehicles 8 located in the travel area 5, for example, is taken into account. For example, it is possible, on the basis of the knowledge of the current position of the transport vehicles 8, their travel paths 28 and therefore their start positions 26 and target positions 27, to sort the order lines 31 so as to prevent any local accumulation, and therefore a blockage, of transport vehicles 8 in the travel area 5 when processing the order lines 31. Therefore, also a travel path specification 25 per transport order is detected. The travel path specification 25 can be integrated in the transport order, or linked with it.

The warehouse management system (WMS)/fleet management system (FMS) transmits the order lines 31 as transport orders 33 and the travel path specifications 25 to the transport vehicles 8 preferably by a wireless communication link 32. According to a preferred embodiment, the transport orders 33 are transmitted selectively to specific transport vehicles 8. Knowing the current position of the transport vehicles 8 enables selective addressing of transport vehicles 8 which are best-suited for the task, for example which are located closest to the start position 26. According to one possible embodiment, it may also be provided that the transport orders 33 are transmitted to all transport vehicles 8, and the autonomous transport vehicles 8 decide independently, by their own sequence control, which transport vehicle 8 accepts which transport order 33.

Each transport vehicle 8 starts to process the transport order 33 accepted/received. Each transport order 33 defines a travel path along which the transport vehicle 8 and the load carrier 9 transported by it are moved.

For a transport order 1.1, a transport vehicle 8 has picked up a load carrier 9 from the takeover station 10 (start position) and transported it to a workstation 7 (target position), wherein the transport vehicle 8 is moved along a first travel path 35.

For a transport order 3.1, a transport vehicle 8 has picked up a load carrier 9 at a workstation 7 (start position) and transported it to the handover station 11 (target position), wherein the transport vehicle 8 is moved along a second travel path 36.

As described above, a transport vehicle 8 may also be configured for transporting multiple load carriers 9 simultaneously. The transport orders 3.2 and 3.3 are processed by such a transport vehicle 8, wherein the transport orders 3.2, 3.3 consist in receiving the load carrier 9 at the takeover station 10 (start position) and first transporting the first load carrier 9 to a first workstation 7 and afterward transporting the second load carrier 9 to a second workstation 7, wherein the transport vehicle 8 is moved along a third travel path 37. When the transport vehicle 8 reaches the first workstation 7 (first target position), the first load carrier 9 is deposited onto the holding area 7-2 of the first workstation 7. When the transport vehicle 8 reaches the second workstation 7 (second target position), the second load carrier 9 is deposited onto the holding area 7-2 of the second workstation 7.

For a transport order 1.2, the transport vehicle 8 is moved along a fourth travel path 38, wherein it travels first from a current position (start position) to a workstation 7, where it receives a load carrier 9 from the holding area 7-3, and afterward from the workstation 7 to the handover station 11 (target position) in order to deposit the load carrier 9 from the transport vehicle 8 onto the handover station 11.

For a transport order 2.1, a transport vehicle 8 has received a load carrier 9 at a first workstation 7 (start position) and transported it to a second workstation 7 (target position), wherein the transport vehicle 8 is moved along a fifth travel path 46.

As not represented in more detail, also a working means load carrier can be transported to a workstation 7, or away from a workstation 7, for a transport order.

As equally not represented in more detail, at least one empty target load carrier 9 can be picked up from the provisioning station 45 (FIGS. 1, 2) and transported to one of the workstations 7 and provisioned at the one of the workstations 7, for a transport order.

As can be gleaned from the figure, the travel paths were planned so as to prevent any accumulation of transport vehicles 8, wherein a longer travel distance is optionally accepted, for example for the fifth travel path 46, in order to thereby prevent a blockage occurring subsequently.

In accordance with the above embodiments, the method for transporting load carriers 9 and for manually executing processing orders in the transport and manipulation system 1 comprises at least the steps:

acquiring transport orders 33 on the warehouse management system (WMS)/fleet management system (FMS), transmitting the transport orders 33 from the warehouse management system (WMS)/fleet management system (FMS) to the control units 39 of the autonomous transport vehicles 8, wherein a transport order 33 defines the travel path of a transport vehicle 8 between a start point 26 and a target point 27 inside the at least one travel area 5, wherein the start point 26 is formed at the takeover station 10 or one of the workstations 7 and the target point 27 is formed at the handover station 11 or one of the workstations 7, evaluating a start point 26 and a target point 27 inside the travel area 5 from the transport order 33 for the respective transport vehicle 8, by the control unit 39 of the respective transport vehicle 8, picking up a load carrier 9 onto the transport vehicle 8 at the start position 26, transporting the load carrier 9 to the target position 27 along a travel path 28, 35, 36, 37, 38, 46 defined by the transport order 33 by the transport vehicle 8 by capturing and evaluating navigation markers 19 at the control unit 39 of the respective transport vehicle 8, and depositing the load carrier 9 at the target position 27, in particular by the transport vehicle 8.

The transport vehicle 8 is moved along the travel path at a first maximum travel speed in the first travel section 12 and at a second maximum travel speed in the second travel section 13.

The second maximum travel speed is higher than the first maximum travel speed.

The exemplary embodiments show possible embodiment variants of the transport and manipulation system, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field. Therefore, also any and all conceivable embodiment variants are comprised by the protective scope which are possible by combination of individual details of the embodiment variant represented and described.

Finally, as a matter of form, it should be noted that for ease of understanding of the structure, elements of the drawings are partially not depicted to scale and/or are enlarged and/or are reduced in size.

LIST OF REFERENCE NUMBERS

1 transport and manipulation system
2 load carrier conveying system
3 provisioning device
4 activity area
5 travel area
6 working area
7 workstation
7-1 work desk
7-2 holding area
7-3 holding area
7-4 user interface
7-5 inbound delivery device
7-6 outbound delivery device
7-7 transfer device
7-8 transfer device
8 transport vehicle
9 load carrier
10 takeover station
11 handover station
12 first travel section
13 second travel section
14 boundary
15 person/operator
16 travel path
17 passing zone
18 capturing means
19 navigation marker
20 passageway
21 barrier
22 structural element
23 design element
24 navigation feature
25 travel path specification
26 start position
27 target position
28 travel path
29 warehouse management system (WMS)
30 orders
31 order lines
32 communication link
33 transport order
34 start position
35 first travel path
36 second travel path
37 third travel path
38 fourth travel path
39 control unit
40 provisioning area
41 first side
42 second side
43 loading plane
44 arrow
45 provisioning station
46 fifth travel path

The invention claimed is:

1. A transport and manipulation system comprising
a warehouse management system,
a mobile conveying system having a plurality of autonomous transport vehicles,
a plurality of source load carriers,
a plurality of target load carriers,
an activity area having
a provisioning device comprising a takeover station and a handover station,
at least one working area, in which a plurality of static workstations for manually executing a plurality of processing orders by persons are arranged, and
at least one travel area, in which the plurality of autonomous transport vehicles move and which connect the provisioning device with the plurality of static workstations, wherein the at least one travel area has a first travel section and a second travel section, the first travel section protrudes into the at least one working area and the second travel section is bounded against the first travel section by a boundary that permits autonomous transport vehicles of the plurality of autonomous transport vehicles to pass through at at least one predetermined passing zone,
wherein at the takeover station, a source load carrier of the plurality of source load carriers is picked up from an autonomous transport vehicle of the plurality of autonomous transport vehicles,
wherein at the handover station, a target load carrier of the plurality of target load carriers is deposited from an autonomous transport vehicle of the plurality of autonomous transport vehicles,
wherein the plurality of autonomous transport vehicles each have a control unit configured for receiving and evaluating transport orders from the warehouse management system,
wherein the plurality of autonomous transport vehicles are automatically and autonomously controlled in accordance with the transport orders and in such a way that a source load carrier of the plurality of source load carriers is picked up at the takeover station, transported to one and provisioned at a first selected static workstation of the plurality of static workstations (7), at least for a first transport order of the transport orders, in order to subsequently execute a respective processing order of the plurality of processing orders at the first selected static workstation of the plurality of static workstations, and a target load carrier of the plurality of target load carriers is picked up at a second selected static workstation of the plurality of static workstations, transported to and deposited at the handover station, at least for a second transport order of the transport orders, after a respective processing order of the plurality of processing orders has been completed at the second selected static workstation of the plurality of static workstations, the second selected static workstation being the same or different from the first selected static workstation, wherein each autonomous transport vehicle of the plurality of autonomous transport vehicles is further configured for receiving a travel path specification and independently following the travel path specification by capturing and evaluating a plurality of navigation markers, wherein in the first travel section, a first maximum travel speed is defined, and in the second travel section, a second maximum travel speed is defined, the second maximum travel speed being higher than the first maximum travel speed, and wherein the control unit of a respective autonomous transport vehicle of the plurality of autonomous transport vehicles is adapted to regulate travel speed of each autonomous transport vehicle of the plurality of autonomous transport vehicles such that the first maximum travel speed and the second maximum travel speed are observed.

2. The transport and manipulation system according to claim 1, wherein the takeover station and/or the handover station of the provisioning device is connected, via a load carrier conveying system, with at least one from the group of article storage for storing articles in the plurality of source load carriers, picking system having one or multiple picking workstations, article receiving area or article issue area.

3. The transport and manipulation system according to claim 1, wherein the at least one travel area and the at least one working area partially overlap.

4. The transport and manipulation system according to claim 1, wherein the at least one travel area is defined by a barrier or by the presence of the plurality of navigation markers.

5. The transport and manipulation system according to claim 1, wherein the plurality of navigation markers is arranged in the at least one travel area.

6. The transport and manipulation system according to claim 1, wherein the plurality of navigation markers is formed by structural features inside a space surrounding the transport and manipulation system.

7. The transport and manipulation system according to claim 1, wherein each autonomous transport vehicle of the plurality of autonomous transport vehicles comprises a control unit having a memory means, configured for storing a map of the plurality of navigation markers.

8. The transport and manipulation system according to claim 1, wherein each autonomous transport vehicle of the plurality of autonomous transport vehicles comprises a control unit having a memory means, configured for storing a map of the at least one travel area and/or of the at least one working area.

9. The transport and manipulation system according to claim 1, wherein at least one static workstation of the plurality of static workstations is configured with a variable position, the at least one static workstation being the same or different from the first selected static workstation or the second selected static workstation.

10. The transport and manipulation system according to claim 1, wherein the control unit of the plurality of autonomous transport vehicles is configured for receiving and evaluating transport orders from the warehouse management system, and wherein the plurality of autonomous transport vehicles are automatically and autonomously controlled in accordance with these transport orders by a source load carrier of the plurality of source load carriers and/or a target load carrier of the plurality of target load carriers being transported between the first selected static workstation of the plurality of static workstations and the second selected static workstation of the plurality of static workstations, for a fourth transport order of the transport orders, wherein the start point and target point for a fourth transport order are formed by the first selected static workstation and the second selected static workstation.

11. The transport and manipulation system according to claim 1, wherein at least one article for a single processing order of the plurality of processing orders is located in the at least one source load carrier of the plurality of source load carriers, or wherein a plurality of articles for a set of processing orders of the plurality of processing orders are located in the at least one source load carrier of the plurality of source load carriers.

12. The transport and manipulation system according to claim 1, wherein at least one static workstation of the plurality of static workstations comprises a work desk having a first side facing the operator and a second side facing the second travel section, wherein the second side forms the boundary, the at least one static workstation being the same or different from the first selected static workstation or the second selected static workstation.

13. The transport and manipulation system according to claim 1, wherein the second travel section surrounds the provisioning device at least in sections.

14. The transport and manipulation system according to claim 1, wherein at least one source load carrier of the plurality of source load carriers is defined as a respective target load carrier of the plurality of target load carriers after the respective processing order of the plurality of processing orders has been executed.

15. The transport and manipulation system according to claim 1, wherein the transport and manipulation system further comprises a plurality of provisioning stations, and wherein the control unit of the plurality of autonomous transport vehicles is configured for receiving and evaluating transport orders from the warehouse management system, and wherein the plurality of autonomous transport vehicles are automatically and autonomously controlled in accordance with these transport orders by at least one target load carrier, being picked up at one provisioning station of the plurality of provisioning stations and transported to a third selected static workstation of the plurality of static workstations and provisioned at the third selected static workstation of the plurality of static workstations, for a fifth transport order of the transport orders, in order to subsequently execute the respective processing order of the plurality of processing orders at the third selected static workstation of the plurality of static workstations, the third selected static workstation being the same or different from the first selected static workstation or the second selected static workstation.

16. The transport and manipulation system according to claim 1, wherein at least one static workstation of the plurality of static workstations has at least one provisioning area configured for providing working means in an initial configuration step, the at least one static workstation being the same or different from the first selected static workstation or the second selected static workstation.

17. The transport and manipulation system according to claim 16, wherein the control unit of the plurality of autonomous transport vehicles is configured for receiving and evaluating transport orders from the warehouse management system, and wherein the plurality of autonomous transport vehicles are automatically and autonomously controlled in accordance with these transport orders by a working means load carrier being transported to a static workstation of the plurality of static workstations, or transported away from the static workstation of the plurality of static workstations, for a third transport order of the transport orders.

18. The transport and manipulation system according to claim 1, wherein a unique identifier is stored in each navigation marker of the plurality of navigation markers.

19. The transport and manipulation system according to claim 5, wherein a set of navigation markers of the plurality of navigation markers are arranged also in the at least one working area, or
wherein a set of navigation markers of the plurality of navigation markers are arranged in the activity area.

20. The transport and manipulation system according to claim 1, wherein the travel path specification comprises a start point and a target point inside the at least one travel area and/or a plurality of navigation markers which are to be followed by the respective autonomous transport vehicle of the plurality of autonomous transport vehicles.

21. The transport and manipulation system according to claim 20, wherein a route section speed is stored in the travel path specification.

22. The transport and manipulation system according to claim 1, wherein at least of one autonomous transport vehicle of the plurality of autonomous transport vehicles
comprises a single loading plane configured for receiving at least two source load carriers of the plurality of source load carriers, at least two target load carriers of the plurality of target load carriers, or at least one source carrier of the plurality of source load carriers and one target load carrier of the plurality of target load carriers are, or
comprises loading planes arranged on top of one another and each configured for receiving at least one source load carrier of the plurality of source load carriers or at least one target carrier of the plurality of target load carriers, so that multiple source load carriers of the plurality of source load carriers, multiple target load carriers of the plurality of target load carriers, or at least one source carrier of the plurality of source load carriers and at least one target carrier of the plurality of target load carriers are transported simultaneously with the at least one autonomous transport vehicle of the plurality of autonomous transport vehicles.

23. The transport and manipulation system according to claim 22, wherein the at least one source carrier of the plurality of source load carriers and the at least one target load carrier of the plurality of target load carriers are assigned to one processing order of the plurality of processing orders, or wherein the at least two source load carriers of the plurality of source load carriers, the at least two target load carriers of the plurality of target load carriers, or the at least one source carrier of the plurality of source load carriers and the at least one target load carrier of the plurality of target load carriers are assigned to different processing orders of the plurality of processing orders.

24. The transport and manipulation system according to claim 1, wherein the boundary is formed by a person access protection.

25. The transport and manipulation system according to claim 24, wherein the person access protection is formed by a mechanical barrier and/or a contactless barrier.

26. The transport and manipulation system according to claim 24, wherein the person access protection comprises a monitoring device configured for identifying an access by the person to the second travel section by passing the person access protection.

27. The transport and manipulation system according to claim 1, wherein at least one static workstation of the plurality of static workstations has a work desk, a holding area for buffering at least one source load carrier of the plurality of source load carriers, a holding area for buffering at least one target load carrier of the plurality of target load carriers, and/or a user interface having an output device and/or an input device, the at least one static workstation being the same or different from the first selected static workstation or the second selected static workstation, and wherein the person is instructed, via the output device of the user interface, to perform a processing step in accordance with the respective processing order of the plurality of processing orders on the at least one article which is removed from the at least one source load carrier, and wherein the person is instructed, via the input device of the user interface, to confirm the processing step.

28. The transport and manipulation system according to claim 27, wherein the holding area for buffering the at least one source load carrier of the plurality of source load carriers is formed on an inbound delivery device and the holding area for buffering the at least one target load carrier of the plurality of target load carriers is formed on an outbound delivery device.

29. The transport and manipulation system according to claim 28, wherein the transport and manipulation system further comprises one or a plurality of transfer devices configured for automatically moving the at least one source load carrier of the plurality of source load carriers between an autonomous transport vehicle of the plurality of transport vehicles and the inbound delivery device and/or configured for automatically moving the at least one target load carrier between an autonomous transport vehicle of the plurality of transport vehicles and the outbound delivery device.

30. A method for transporting a plurality of load carriers and for manually executing a plurality of processing orders in a transport and manipulation system comprising an activity area, the activity area having
a provisioning device comprising a takeover station and a handover station,
at least one working area, in which a plurality of static workstations for manually executing the plurality of processing orders by persons are arranged, and
at least one travel area, in which a plurality of autonomous transport vehicles move and which connect the provisioning device with the plurality of static workstations, wherein the at least one travel area has a first travel section and a second travel section, the first travel section protrudes into the at least one working area and the second travel section is bounded against the first travel section by a boundary that permits autonomous transport vehicles of the plurality of autonomous transport vehicles to pass through at at least one predetermined passing zone, the method comprising the steps:
- acquiring transport orders at a warehouse management system,
- transmitting the transport orders from the warehouse management system to control units of the plurality of autonomous transport vehicles, wherein a transport order defines a travel path of a respective autonomous transport vehicle of the plurality of autonomous transport vehicles between a start point and a target point inside the at least one travel area, wherein the start point is formed at the takeover station or a first selected static workstation of the plurality of static workstations and the target point is formed at the handover station or a second selected static workstation of the plurality of static workstations, the second selected static workstation being the same or different from the first selected static workstation,
- evaluating a start point and a target point inside the at least one travel area from the transport order for the respective autonomous transport vehicle of the plurality of autonomous transport vehicles, by the control unit of the respective autonomous transport vehicle of the plurality of autonomous transport vehicles,
- picking up at least one load carrier of the plurality of load carriers onto the respective autonomous transport vehicle of the plurality of autonomous transport vehicles at the start position,
- transporting the at least one load carrier of the plurality of load carriers to the target position along the travel path defined by the transport order using the respective autonomous transport vehicle of the plurality of autonomous transport vehicles by capturing and evaluating a plurality of navigation markers at the control unit of the respective autonomous transport vehicle of the plurality of autonomous transport vehicles,
- depositing the at least one load carrier of the plurality of load carriers at the target position,
- wherein the respective autonomous transport vehicle of the plurality of autonomous transport vehicles is moved along the travel path at a first maximum travel speed in the first travel section and at a second maximum travel speed in the second travel section, wherein the second maximum travel speed is higher than the first maximum travel speed).

31. The method according to claim 30, wherein the respective autonomous transport vehicle of the plurality of autonomous transport vehicles autonomously travels to the start position after the transport order has been evaluated.

32. The method according to claim 30, wherein the second maximum travel speed is defined as equal to the first maximum travel speed when a person accesses the second travel section from the first travel section by passing the boundary.

33. The method according to claim 30, wherein the travel speed of the autonomous transport vehicles of the plurality of autonomous transport vehicles each is gradually adjusted when the autonomous transport vehicles of the plurality of autonomous transport vehicles each passes through at the at least one predetermined passing zone.

34. The method according to claim 30, wherein the travel path in the second travel section is more than 50% straight-lined.

35. The method according to claim 30, wherein the at least one travel area and/or the at least one working area is defined inside the activity area in a configuration step.

* * * * *